(12) United States Patent
Hedges

(10) Patent No.: US 12,471,586 B2
(45) Date of Patent: Nov. 18, 2025

(54) DEVICE FOR COOLING A LIVEWELL

(71) Applicant: Albert Hedges, Ozark, MO (US)

(72) Inventor: Albert Hedges, Ozark, MO (US)

(73) Assignee: Albert Hedges, Ozark, MO (US)

( * ) Notice: Subject to any disclaimer, the term of this patent is extended or adjusted under 35 U.S.C. 154(b) by 0 days.

(21) Appl. No.: 17/816,845

(22) Filed: Aug. 2, 2022

(65) Prior Publication Data

US 2022/0361470 A1  Nov. 17, 2022

Related U.S. Application Data

(63) Continuation-in-part of application No. 16/723,084, filed on Dec. 20, 2019, now abandoned.

(60) Provisional application No. 62/782,863, filed on Dec. 20, 2018.

(51) Int. Cl.
*A01K 97/20* (2006.01)
*F25D 11/00* (2006.01)
*F25D 31/00* (2006.01)

(52) U.S. Cl.
CPC ............ *A01K 97/20* (2013.01); *F25D 11/003* (2013.01); *F25D 31/006* (2013.01)

(58) Field of Classification Search
CPC ...... A01K 63/065; A01K 63/02; A01K 97/00; A01K 97/20; B63B 34/05; B63B 35/26
USPC ......................................................... 119/201
See application file for complete search history.

(56) References Cited

U.S. PATENT DOCUMENTS

| | | | | |
|---|---|---|---|---|
| 3,964,510 A * | 6/1976 | Roller | ............... | F16K 31/52425 251/251 |
| 4,748,765 A * | 6/1988 | Martin | .................... | A01K 97/05 43/55 |
| 5,010,836 A * | 4/1991 | Riviezzo | ................. | B63B 35/14 114/255 |
| 6,038,993 A * | 3/2000 | Vento | ..................... | B63B 35/14 114/255 |
| 6,862,894 B1 * | 3/2005 | Miles | ...................... | F25B 27/00 62/238.6 |
| 7,134,293 B2 * | 11/2006 | Rabal | ..................... | A01K 97/20 62/185 |
| 10,081,417 B2 * | 9/2018 | Brower | .................. | B63H 11/02 |
| 10,823,444 B2 * | 11/2020 | Van Eldik | ............... | F24F 11/52 |
| 10,990,622 B2 * | 4/2021 | Laster | ................... | G06F 16/444 |
| 2004/0118359 A1 * | 6/2004 | Badell | .................... | A01K 63/02 119/203 |

(Continued)

OTHER PUBLICATIONS

Chasechillers (https://chasechillers.com/water-cooled-and-air-cooled-chillers/, Dec. 2018) (Year: 2018).*

*Primary Examiner* — Morgan T Jordan
*Assistant Examiner* — Carly W. Lynch
(74) *Attorney, Agent, or Firm* — Husch Blackwell LLP

(57) ABSTRACT

A modular apparatus and system for managing the temperature of a livewell or other container housing water, and an associated method for installing the same. The system featuring a self-contained fluid line in communication with a first fluid line, which is in fluid communication with the livewell. The modular apparatus generally featuring the system and an enclosure. The enclosure can be located adjacent the livewell and detachably coupled to a fishing vessel. The modular apparatus and system can further comprise a condenser, which can be a forced air coil unit, a liquid-cooled unit, or a cold plate heat sink unit.

22 Claims, 16 Drawing Sheets

(56) References Cited

U.S. PATENT DOCUMENTS

| | | | |
|---|---|---|---|
| 2005/0204610 A1* | 9/2005 | Bogart | A01K 97/20 43/55 |
| 2013/0226044 A1* | 8/2013 | Moore | A61H 33/0087 601/15 |
| 2020/0236912 A1* | 7/2020 | Hedges | A01K 63/02 |
| 2022/0079125 A1* | 3/2022 | Wang | C02F 1/008 |
| 2023/0180723 A1* | 6/2023 | Ostmeyer | A01K 63/02 |

* cited by examiner

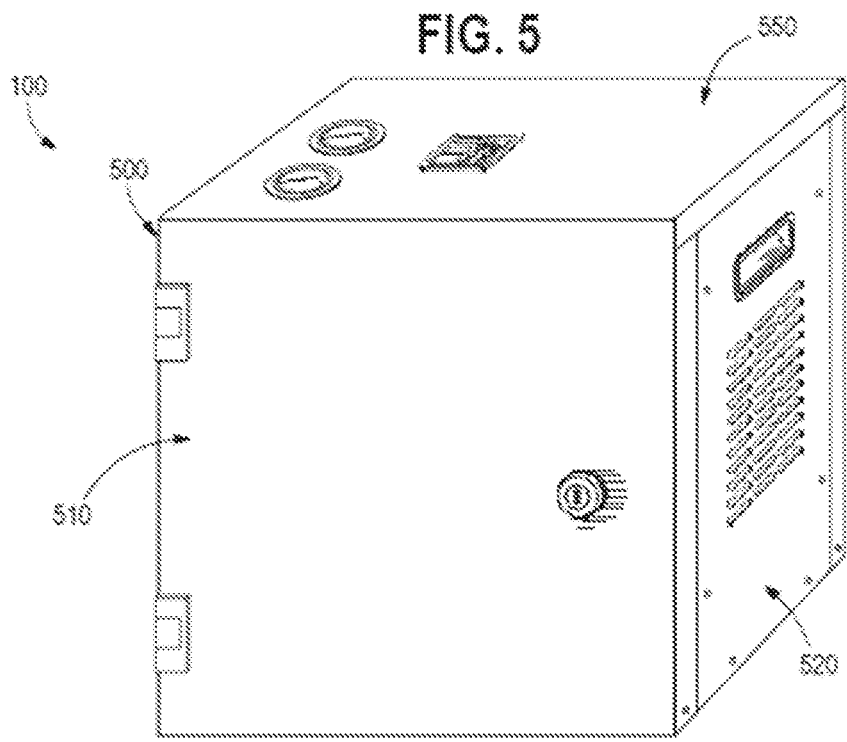
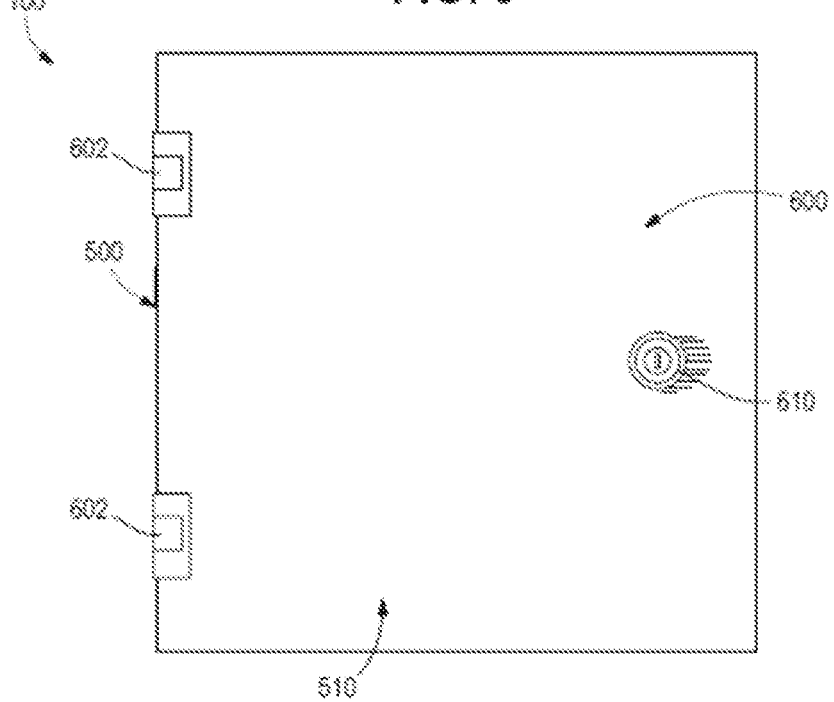

DEVICE FOR COOLING A LIVEWELL

CROSS-REFERENCE TO RELATED APPLICATIONS

This application claims priority to U.S. Provisional Patent Application No. 62/782,863, filed Dec. 20, 2018, entitled "Device for Cooling a Live Well of a Boat". The entire disclosure, including the specification and drawings, of the above-referenced application is incorporated herein by reference. This application is also a continuation-in-part application claiming priority to U.S. application Ser. No. 16/723,084, entitled "Device for Cooling a Livewell". The entire disclosure, including the specification and drawings, of U.S. application Ser. No. 16/723,084 is also incorporated herein by reference.

FIELD

The present invention relates generally to fishing equipment and, more particularly, to an apparatus and system, and associated method for installing the same, for managing the temperature of a livewell or other container housing water.

BACKGROUND

Conventional livewell designs lack adequate means for effectively managing the temperature of the various liquids contained therein and fail to adequately and effectively preserve the health of fish and other aquatic animals that may be temporarily stored in the livewell. Although there are some means for managing the temperature of water contained within livewells and other similar environments, such designs are large, expensive, and incapable of managing the temperature with the level of precision required to preserve certain fish, including sport or game fish, live bait, and other aquatic animals.

Existing means for managing the temperature of water contained within livewells and other similar environments include the use of ice, chemicals, and thermoelectric means, which can be cost-prohibitive and not a practical option for fishers, whether professional or amateur. Further, such known means do not provide means for readily scaling their use to larger or smaller applications, as needed. Nonetheless, the temperature of water contained within livewells and other similar environments must be regulated for various reasons. For example, it may be necessary to regulate the temperature to extend the life of caught fish and other aquatic animals. Alternatively, it may be necessary to regulate the temperature to accommodate various the environmental demands required for certain species of fish and other aquatic animals, such as fish, crayfish, shrimp, and so on. Further yet, it may be necessary to regulate the temperature to provide an optimal environment for fish and other aquatic animals to preserve the health of the fish and other aquatic animals in temporary and mobile storage.

Accordingly, a need exists for an improved apparatus and associated method for managing the temperature of a livewell provided for preserving the health of fish and other aquatic animals in temporary and mobile storage, including, without limitation, in a manner that is more efficient, cost-effective, adaptable, and compact while also rendering a higher level of precision over known means.

SUMMARY OF THE INVENTION

Disclosed herein is a modular apparatus and system for managing the temperature of a livewell or other container housing water, and an associated method for installing the same. The modular apparatus can generally comprise a self-contained fluid line, a first fluid line in communication with the self-contained fluid line and configured to provide fluid communication between the modular apparatus and the livewell, a condenser in communication with the self-contained fluid line, and a controller. In some embodiments, the self-contained fluid line can comprise an expansion valve in fluid communication with a compressor, the controller can be configured to communicate with a temperature probe that detects a temperature of water in the livewell and control at least one of the condenser, compressor, and expansion valve to cause the temperature of the water in the livewell to reach a desired temperature.

In exemplary embodiments, a method can comprise regulating the temperature of the livewell using temperature regulation components of a modular apparatus, receiving a first signal from a sensor, determining whether the first signal corresponds to one of a plurality of errors statuses, deactivating the temperature regulation components in response to determining that the first signal corresponds to one of the plurality of error statuses, wherein the temperature regulation components include at least one of a compressor, a condenser, and an evaporator, determining whether a second signal indicates that the one of the plurality of error statuses has cleared, and reactivating the temperature regulation components in response to determining that the second signal indicates that the one of the plurality of error statutes has cleared.

A system can comprise a self-contained fluid line, a first fluid line in communication with the self-contained fluid line and configured to provide fluid communication between the modular apparatus and the livewell, a condenser in communication with the self-contained fluid line, and a controller. In some embodiments, the self-contained fluid line can comprise an expansion valve in fluid communication with a compressor, the controller can be configured to communicate with a temperature probe that detects a temperature of water in the livewell and control at least one of the condenser, compressor, and expansion valve to cause the temperature of the water in the livewell to reach a desired temperature. The system can further include a fishing vessel comprising: the livewell, a second fluid line, an entry port on a fishing vessel, wherein the entry port allows water from a body of water to enter a second fluid line, an exit port connected to the second fluid line that expels water from the second fluid line out into the body of water.

BRIEF DESCRIPTION OF THE FIGURES

In the accompanying drawings, which form a part of the specification and are to be read in conjunction therewith:

FIG. 5 is a perspective view of an apparatus for managing the temperature of a livewell in accordance with one embodiment of the present invention;

FIG. 6 is a front view of the apparatus for managing the temperature of a livewell of FIG. 5;

DESCRIPTION

Figure 1:
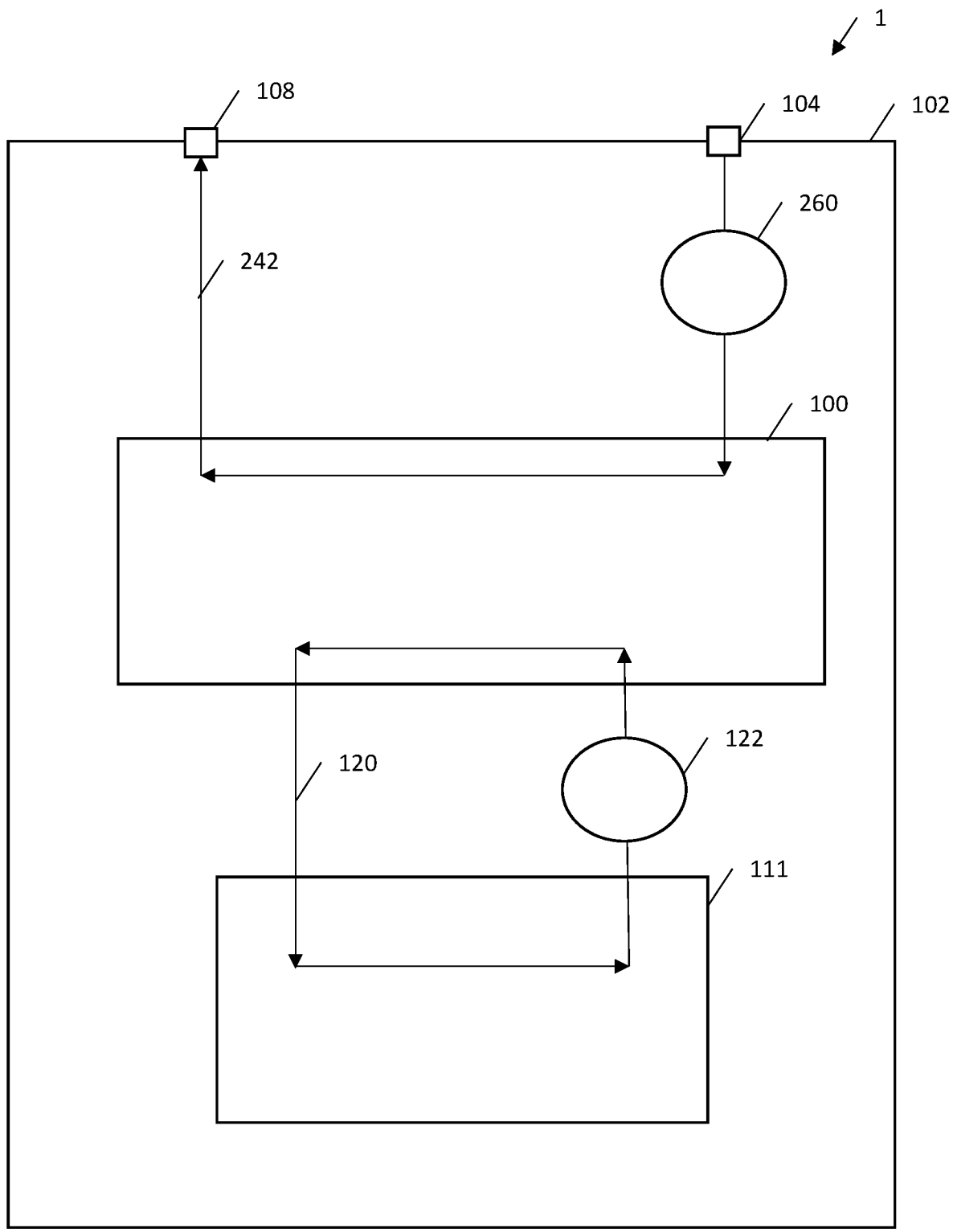
FIG. 1 is a schematic view of an system including an apparatus for managing the temperature of a livewell in accordance with one embodiment of the present invention.

Various embodiments of the present invention are described and shown in the accompanying materials, descriptions, instructions, and drawings. For purposes of clarity in illustrating the characteristics of the present invention, proportional relationships of the elements have not necessarily been maintained in the drawings. It will be appreciated that any dimensions included in the drawings are simply provided as examples and dimensions other than those provided therein are also within the scope of the invention.

The description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

FIG. 1 illustrates an example system 1 that includes a modular apparatus 100. According to an exemplary embodiment, the system 1 can comprise a fishing vessel 102 or other vehicle that includes a livewell 111; however, the present invention is not limited to use in a fishing vessel. The modular apparatus 100 can be included within or added to the fishing vessel 102 or added to large land livewells. In an embodiment where the modular apparatus 100 is added to the fishing vessel 102, the fishing vessel 102 can be retrofitted by disconnecting a first fluid line 120 and a second fluid line 242 and subsequently connecting the first fluid line 120 and the second fluid line 242 to the modular apparatus 100, and such a method is described in further detail below with regard to FIG. 17.

The modular apparatus 100 can couple to a first pump 122 and a second pump 260. In one embodiment, the first and second pumps 122, 26 may each be an external pump, such as a pump included as part of the fishing vessel 102, a manual pump, or an automatic but unconnected pump (e.g., battery powered). In the fishing vessel embodiment, those of skill in the art will recognize that many professional or commercial fishing vessels include or accommodate one or more pumps for pumping lake or ocean water into a livewell or for other fishing or boat-related purposes (e.g., bilge pump). The exemplary embodiments can retrofit the pump and livewell system as shown in FIG. 1. In some embodiments, a second pump may be omitted as the first pump 122 can provide pumping force for both the first fluid line 120 and the second fluid line 260.

As shown, the second pump 260 can be in fluid communication with an entry port 104 via the second fluid line 242. The entry port 104 can exist on a hull of the fishing vessel 102, and the second pump 260 can pull in water through the entry port 104 through the second fluid line 242. The second pump 260 can comprise a pump included as part of the fishing vessel's livewell system or any other pump. While two pumps are shown in FIG. 1, each end user of the modular apparatus 100 can chose to use more than two pumps for their applications. The fishing vessel 102 can further include an exit port 108. The exit port 108 can exist on the hull of the fishing vessel 102, water can be expelled back into a body of water through the exit port 108 via the second fluid line 242. As explained above, the second pump 260, the entry port 104, the second fluid line 242, and the exit port 108 may be preinstalled within a fishing vessel or may come with the purchase of a particular fishing vessel. However, in another embodiment, the second pump 260, the entry port 104, the second fluid line 242, and the exit port 108 may be aftermarket installed within any boat or water vehicle as well as in applications where the livewell exists on land. In some embodiments, the second fluid line 242 is modular, as a portion of the second fluid line 242 exists within the modular apparatus 100, and only some of the second fluid line 242 is preinstalled with the fishing vessel 102.

The second fluid line 242 can further connect to and extend through the modular apparatus 100. The second pump 260 can pull water in from the body of water via the second fluid line 242, the water in the second fluid line 242 can communicate with a condenser 130 within the modular apparatus 100 to receive heat extracted by the modular apparatus 100, and return heated water back to the body of water via the second fluid line 242.

The fishing vessel 102 can further include a livewell 111. As shown, the first fluid line 120 can couple to the livewell 111 and carry water exiting the livewell 111 to the modular apparatus 100 and transmit chilled fluid to the livewell 111. The first fluid line 120 can further couple to a first pump 122 to circulate water between the modular apparatus 100 and the livewell 111, but the first pump 122 may be omitted in embodiments where a single pump moves fluid within both the first fluid line 120 and the second fluid line 242. By circulating fluid between the livewell 111 and the modular apparatus 100, a water temperature within the livewell 111 may be regulated or managed, such as by chilling the temperature to a predetermined or selected temperature to accommodate aquatic live within the livewell 111. The livewell 111 can comprises a container for housing water, or another liquid. In one embodiment, the livewell 111 can be capable of storing at least one fish or aquatic animal. In another embodiment, the livewell 111 can be coupled to the fishing vessel 102. The livewell 111 can be coupled to the fishing vessel 102 in a variety of ways, including, without limitation, fixedly attached or detachably attached to the fishing vessel 102. In yet another embodiment, the livewell 111 can be located on or adjacent to land, such as near a body of water or on a dock. However, it will be understood that the livewell 111 can be located at any other location on land. The livewell 11 can be adapted to store and keep aquatic life alive and healthy for various reasons, including, without limitation, to store or transport the aquatic life, and for other reasons. Such aquatic life can include freshwater fish, such as crayfish, minnows, freshwater bait fish and fish bait, caught fish and other aquatic life and the like, and saltwater fish, such as shrimp, lobster, saltwater bait fish and fish bait, caught fish and aquatic life, and the like.

The present invention relates to an apparatus and system, and a method for installing the same, for managing the temperature of a livewell or other container housing water. The modular apparatus 100 can generally comprise: (a) a self-contained fluid line 110; (b) a compressor 112; (c) an expansion valve 114; (d) a first fluid line 120; and (e) a condenser 130. In one embodiment, the modular apparatus 100 can further comprise an evaporator 150.

Figure 2A:
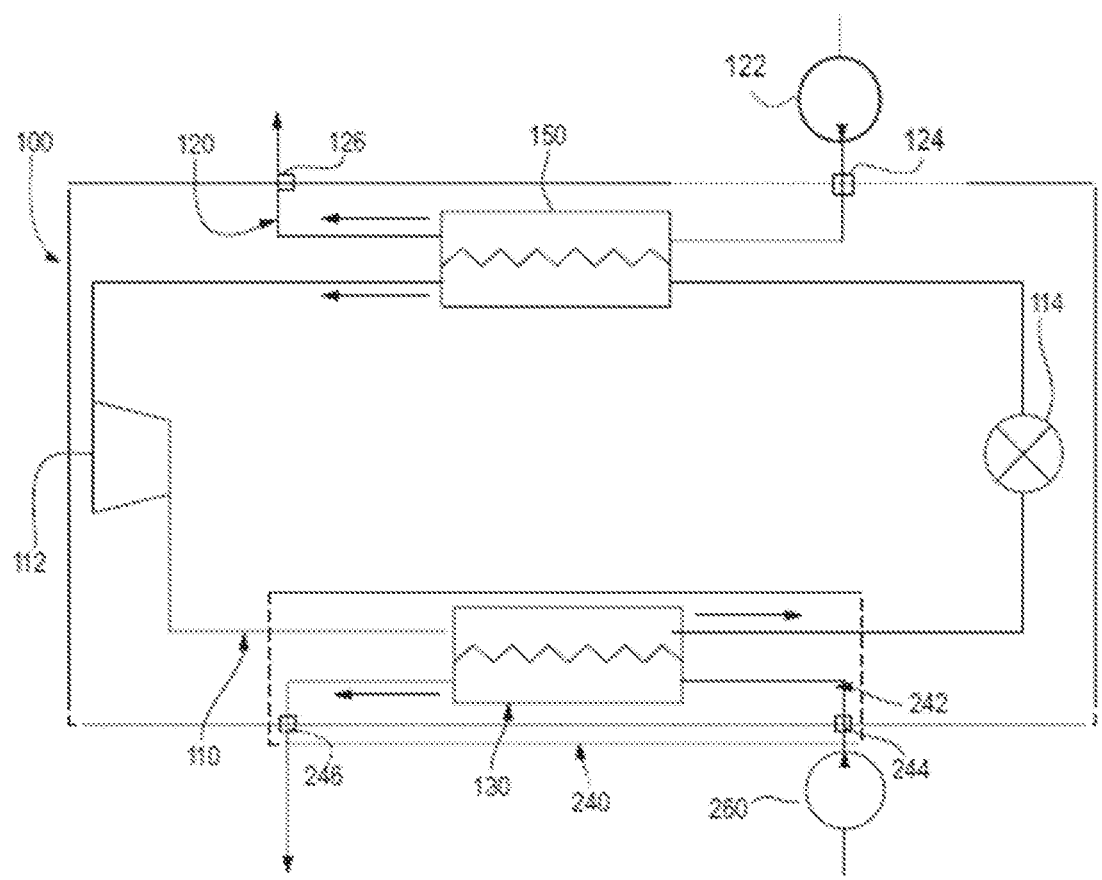
FIGS. 2A and B are each a schematic view of an apparatus for managing the temperature of a livewell in accordance with another embodiment of the present invention.
Figure 2B:
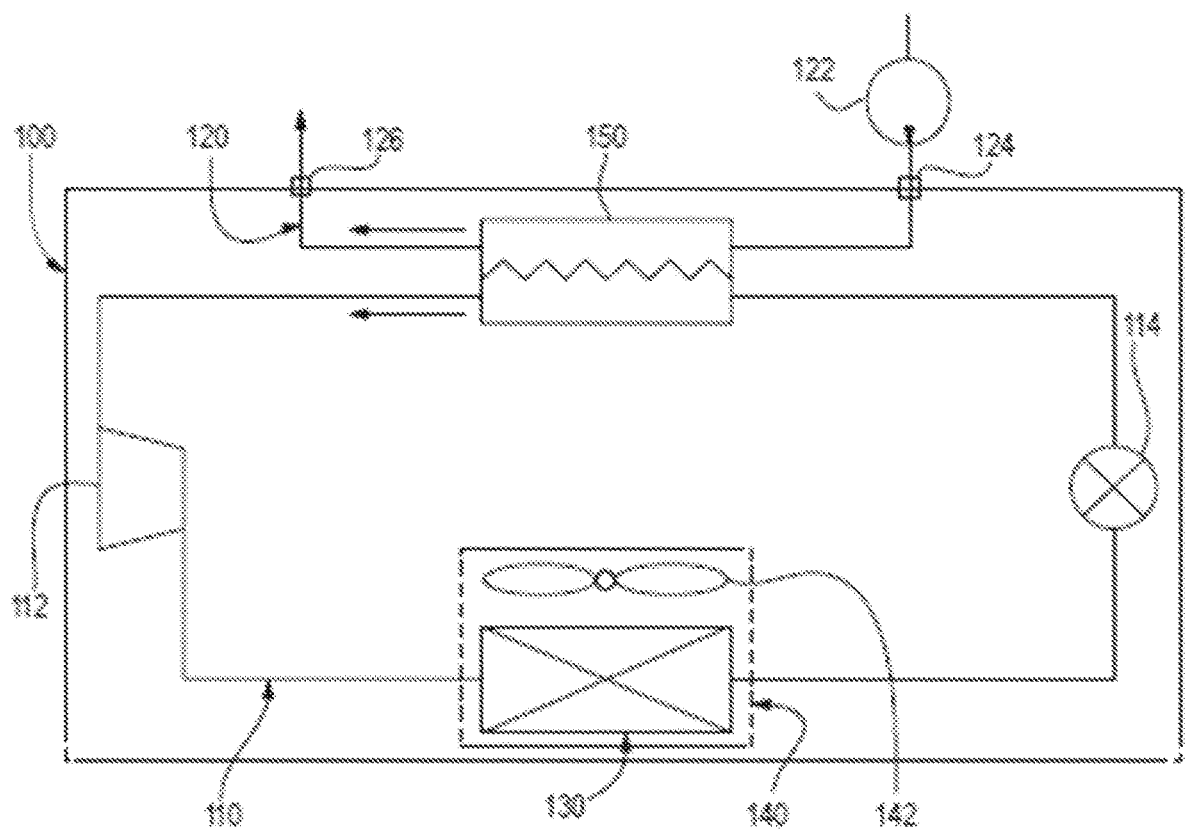
Figure 3:
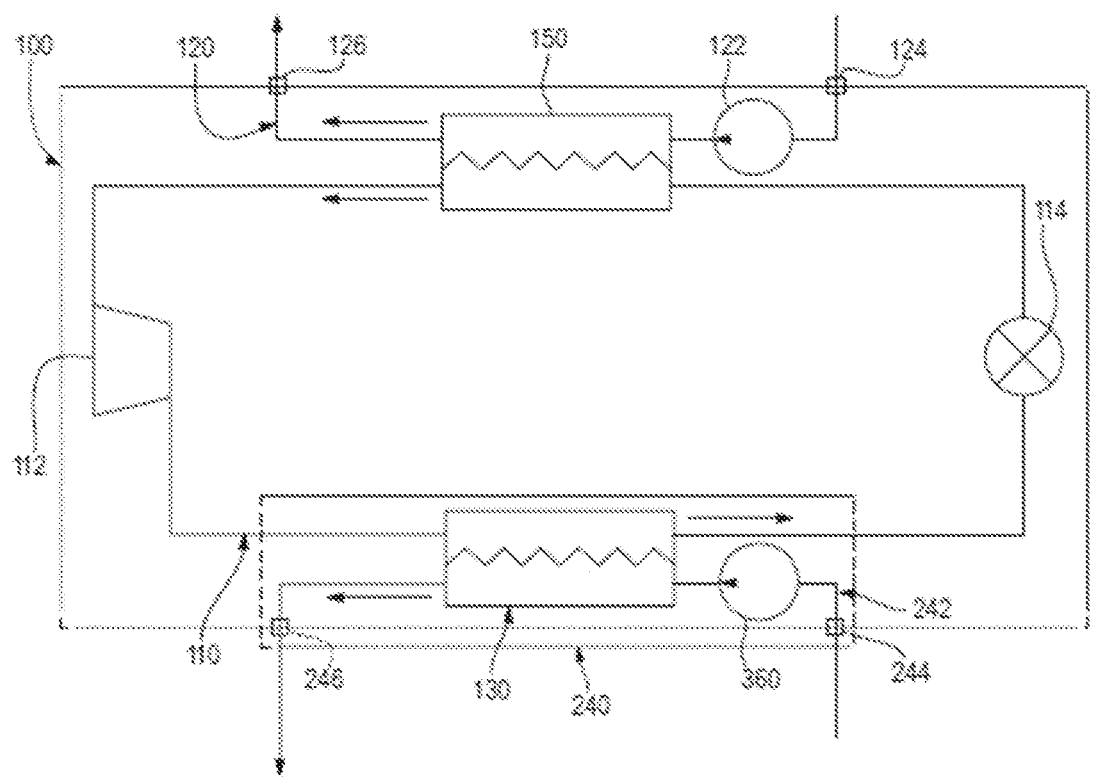
FIG. 3 is a schematic view of an apparatus for managing the temperature of a livewell in accordance with yet another embodiment of the present invention.
Figure 4:
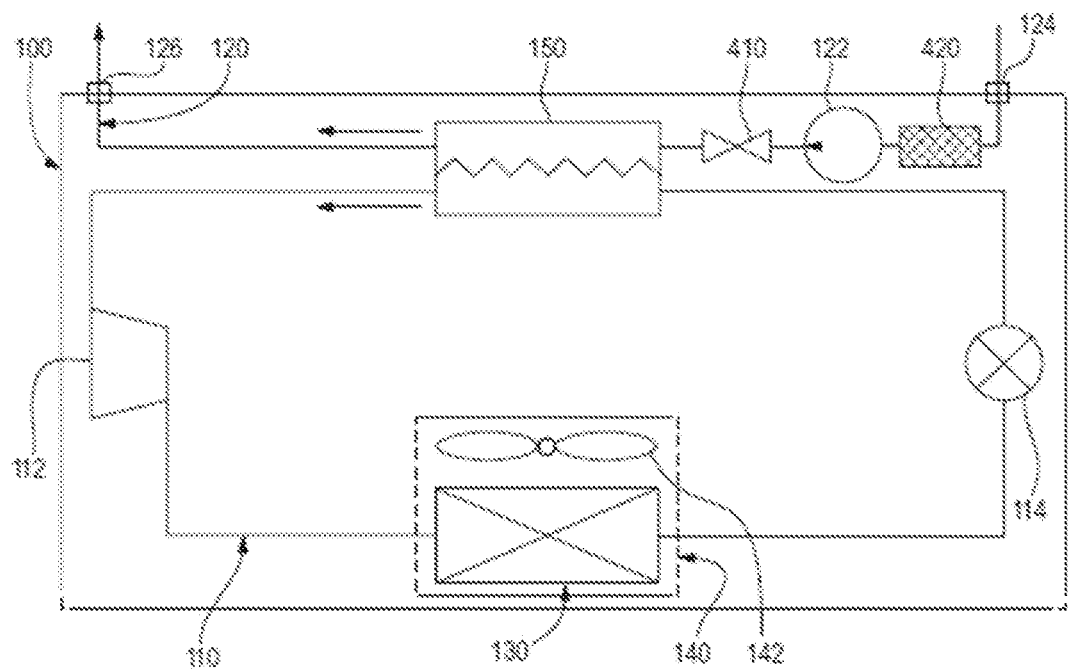
FIG. 4 is a schematic view of an apparatus for managing the temperature of a livewell in accordance with even yet another embodiment of the present invention.

Referring to FIGS. 2-4, the self-contained fluid line 110 may comprise the compressor 112 coupled to and/or in fluid communication with the expansion valve 114 and be adapted for circulating a desired medium (not shown), including, without limitation, a refrigerant, such as fluorocarbons, chlorofluorocarbons, various freon types, ammonia, sulfur dioxide, propane and other non-halogenated hydrocarbons, and the like. The self-contained line 110 may confine the desired medium in a flexible hose or hoses (not shown), or through the use of other flexible tubing, including copper tubing, flexible piping, and future discovered materials, whether presently known or later developed.

In one embodiment, the compressor 112 can be adapted for converting the desired medium of the self-contained fluid line 110, including, without limitation, a refrigerant, from one state to another state. In one embodiment, the compressor 112 can be adapted for converting a refrigerant from a liquid state to a gaseous state, which can aid in the circulation of the refrigerant in the self-contained fluid line 110.

The expansion valve 114 can be adapted for converting the desired medium of the self-contained fluid line 110, including, without limitation, a refrigerant, from one state to another state. In one embodiment, the expansion valve 114 can be adapted for converting a refrigerant from a gaseous state to a liquid state by decreasing the pressure of the refrigerant or other fluid, which can aid in the circulation of the refrigerant in the self-contained fluid line 110.

Therefore, in combination, the self-contained fluid line 110 can be adapted to convert a desired medium, such as a refrigerant, from liquid state to a gaseous state, via the compressor 112, and back to a liquid state, via the expansion valve 114. Such phase transitions being capable of aiding in the temperature management nature of the self-contained fluid line.

The first pump 122 may further connect to the first fluid line 120. The first fluid line 120 may be in communication with the self-contained fluid line 110. The self-contained fluid line 110 can be adapted to remove heat from a desired liquid flowing within or through the first fluid line 120. The first pump 122 may be coupled to and/or in fluid communication with a first inlet port 124 and a first outlet port 126 of the apparatus 100. The first pump 122 can be adapted for selectively displacing or moving a desired liquid between the livewell 111 and the modular apparatus 100. In one embodiment, the first pump 122 can generally comprise a hydraulic pump. The first inlet port 124 and the first outlet port 126 may be in fluid communication with the livewell 111, another water-storage container, and/or any additional livewells. In one embodiment, the first inlet port 124 and the first outlet port 126 are located on a side or panel of an enclosure surrounding the apparatus 100 (see FIG. 9). The first fluid line 120 may confine the desired liquid in a flexible hose or hoses (not shown), or through the use of other flexible tubing, including copper tubing, PVC, other non-corrosion sea water resistant material of pipes, joints, and sections, whether presently known or later developed. It will be understood that the first fluid line 120, and the components thereof, can be adapted for interchangeably using different desired liquids, including, without limitation, the interchangeable use of freshwater and saltwater. In one embodiment, to achieve such desired interchangeability, the first fluid line 120, and the components thereof, can comprise high-grade stainless steel components, or other suitable corrosion-resistant materials.

The condenser 130 can be adapted to remove heat from the desired medium of the self-contained fluid line 110. While a condenser 130 is described herein, the condenser 130 may comprise heat exchanger related parts and materials. As shown in FIGS. 1-4, the condenser 130 can be adapted for a variety of arrangements, including, without limitation, as a forced air coil unit 140, a liquid-cooled unit 240, or a cold plate heat sink unit (not shown). In one embodiment, when the desired medium contacts or enters the condenser 130, heat may be exchanged or transferred from the medium to another medium of lower temperature that may be stationary or in motion. Accordingly, the medium that contacted or entered the condenser 130 may exit the condenser 130 in a different state, including, without limitation, at a lower temperature, than when it contacted or entered the condenser 130. In another embodiment, the condenser 130 can be adapted for removing heat from the desired medium of the self-contained fluid line 110 while it is in circulation therein.

In one embodiment of the present invention, the condenser 130 can be a forced air coil unit, wherein the forced air coil unit may comprise a fan or other air or fluid circulator or agitator. In one embodiment of the present invention, the forced air coil unit can be adapted so that the fluid agitator is coupled with the self-contained fluid line 110, and the self-contained fluid line 110 can be in communication with another desired medium (not shown) circulated or agitated by the fluid agitator. In another embodiment, the medium circulated or agitated by the fluid agitator can include air, including, without limitation, ambient air in a fishing vessel or other similar environments.

The modular apparatus 100 can further include flow sensors, which may be positioned at the first inlet port 124, the first outlet port 126, a second inlet port 244 and/or a second outlet port 246 to detect an amount of liquid moving through the first fluid line 120 and/or the second fluid line 242. In another embodiment, the flow sensors are positioned within one of or all of the first fluid line 120 and/or the second fluid line 242. The flow sensors can determine whether liquid is moving within one or all of the first fluid line 120 and/or the second fluid line 242. In yet another embodiment, the flow sensors may be positioned at the entry port 104 and the exit port 108.

As best depicted in FIGS. 2A and 3, in one embodiment of the present invention, the condenser 130 can be a liquid-cooled unit 240 comprising the second fluid line 242. As shown in FIG. 2, the second fluid line 242 may be in communication with the self-contained fluid line 110 and the second pump 260. The second pump 260 may be coupled to and/or in fluid communication with a second inlet port 244 and a second outlet port 246 of the apparatus 100. The second pump 260 can be adapted for selectively displacing or moving a desired liquid through the second fluid line 242, which can aid in the circulation of the desired liquid therein. In one embodiment, the second pump 260 can generally comprise a hydraulic pump.

While FIG. 2A illustrates a modular apparatus with four ports and two fluid lines, a two-port, single fluid line example is also envisioned, as shown in FIG. 2B. The embodiment shown in FIG. 2B can be adapted to chill on-land applications, such as a swimming pool. As shown, the modular apparatus 100 embodiment shown in FIG. 2B can include the self-contained fluid line 110, the compressor 112, the expansion valve 114, the first fluid line 120, the first inlet port 124, the first outlet port 126, the condenser 130, and the evaporator 150. Also, the modular apparatus 100 of FIG. 2B can connect to the first pump 122. These components can function in the same or similar method as the modular apparatus shown in FIG. 2A. However, as stated above, the embodiment shown in FIG. 2B can omit a second fluid line and a second pump.

The embodiment shown in FIG. 2B can further include a fluid agitator 142. The condenser 130 can be adapted to remove heat from the desired medium of the self-contained fluid line 110. As shown in FIGS. 1-4, the condenser 130 can be adapted for a variety of arrangements, including, without limitation, as a forced air coil unit 140, a liquid-cooled unit 240, or a cold plate heat sink unit (not shown). In one embodiment, when the desired medium contacts or enters the condenser 130, heat may be exchanged or transferred from the medium to another medium of lower temperature that may be stationary or in motion. Accordingly, the medium that contacted or entered the condenser 130 may exit the condenser 130 in a different state, including, without limitation, at a lower temperature, than when it contacted or entered the condenser 130. In another embodiment, the condenser 130 can be adapted for removing heat from the desired medium of the self-contained fluid line 110 while it is in circulation therein.

As illustrated in FIG. 1, in one embodiment of the present invention, the condenser 130 can be a forced air coil unit 140, wherein the forced air coil unit 140 may comprise a fan or other air or fluid circulator or agitator 142. As best illustrated in FIG. 1, in one embodiment of the present invention, the forced air coil unit 140 can be adapted so that the fluid agitator 142 is coupled with the self-contained fluid line 110, and the self-contained fluid line 110 can be in communication with another desired medium (not shown) circulated or agitated by the fluid agitator 142. In another embodiment, the medium circulated or agitated by the fluid agitator 142 can include air, including, without limitation, ambient air in a fishing vessel or other similar environments.

The embodiment of FIG. 2B remove heat through a vent or other device rather than a second fluid line. In addition, the embodiment of FIG. 2B can connect to any fluid reservoir through the first fluid line 120 and regulate the temperate of a fluid within the fluid reservoir.

The modular apparatus of FIG. 2B can run on 220 V AC electricity because the modular apparatus may be regulating the temperature of a very large amount of water, such as water in a swimming pool. However, in some embodiments, the modular apparatus is salt water friendly and not limited to fresh water or water having chlorine. The modular apparatus of FIG. 2B can further connect to, either wirelessly or through a wired connection, a temperature probe, which may be located in an incoming pipe from the swimming pool or other liquid reservoir. This incoming pipe can also include a filter system, which can also be powered by a 220 V AC power source. The result of the modular apparatus of FIG. 2B can chill water at a lowered cost, as 220 V AC may be less expensive than 110 V power.

As shown in FIG. 3, in another embodiment of the present invention, the modular apparatus 100 can include the first pump 122 and the second pump 260, and the modular apparatus 100 can house and include the first pump 122 and the second pump 260.

According to exemplary embodiments depicted in FIGS. 2 and 3, the second fluid line 242 may confine the desired liquid in a flexible hose or hoses (not shown), or through the use of other flexible tubing, including copper tubing, whether presently known or later developed. The desired liquid confined by the second fluid line 242 can include, without limitation, lake or ocean water at an environmental temperature. The water can enter the apparatus at the second inlet port 244 and travel into and through the apparatus 100 to the second outlet port 246 via the second fluid line 242 under the influence of the second pump 260. As such, the water can pass through the condenser 130 to transfer or remove heat from the medium that is circulating in the self-contained fluid line 110. In one embodiment, the second inlet port 244 and the second outlet port 246 be located on a side or panel (not shown) of an enclosure (not shown) surrounding the apparatus 100, which may be the same side or panel as the first inlet port and the first outlet port. It will be understood that the second fluid line 242, and the components thereof, can be adapted for interchangeably using different desired liquids, including, without limitation, the interchangeable use of freshwater and saltwater. In one embodiment, to achieve such desired interchangeability, the second fluid line 242, and the components thereof, can comprise high-grade stainless steel components, or other suitable corrosion-resistant materials.

In another embodiment, the condenser 130 can be a cold plate heat sink unit, also known as a heat exchanger, wherein the cold plate heat sink unit can generally comprise at least one highly conductive material, including, without limitation, aluminum or copper. In one embodiment, the conductive material of the cold plate heat sink unit is capable of withdrawing heat from a medium, including, without limitation, a refrigerant, and dissipating the heat into ambient air or environments.

The present invention may further comprise an evaporator 150. In one embodiment, the evaporator 150 can be coupled to and/or in fluid communication with the self-contained fluid line 110 and the first fluid line 120. In one embodiment, the evaporator 150 can comprise coils, cold plates, or other suitable components capable of achieving the desired results. The evaporator 150 can be adapted to remove heat from a desired medium of the first fluid line 120, including, without limitation, stationary, moving, or circulating liquids. In one embodiment, when the desired medium contacts or enters the evaporator 150, heat may be exchanged or transferred from the medium to another medium of lower temperature that may be stationary or in motion. Accordingly, the medium that contacted or entered the evaporator 150 may exit the evaporator in a different state, including, without limitation, at a lower temperature, than when it contacted or entered the evaporator 150. In another embodiment, the evaporator 150 can be adapted for removing heat from the desired medium of the first fluid line 120 while it is in circulation in the first fluid line 120. In yet another embodiment, the evaporator 150 can be adapted for exchanging or transferring heat to the desired medium of the self-contained fluid line 110.

As shown in FIG. 4, in another embodiment, the present invention may further comprise a first fluid line control valve 410 and/or a first filter 420. In one embodiment, the first fluid line control valve 410 may be coupled to and/or in fluid communication with the first fluid line 120, the first pump 122, the first inlet port 124, and the first outlet port 126 of the apparatus 100. The first fluid line control valve 410 can be adapted for managing the flow of the liquid that is selectively displaced or moved by the first pump 122. In one embodiment, the first fluid line control valve 410 can be adapted for regulating the flow rate of water that is displaced or moved by the first pump 122.

In another embodiment, the first filter 420 may be coupled to and/or in fluid communication with the first fluid line 120, the first pump 122, the first inlet port 124, and the first outlet port 126 of the apparatus 100. The first filter 420 can be adapted for removing debris and contaminants from the desired liquid that is moving through the first fluid line 120, which can aid in the circulation of the desired liquid and the heat transfer between the self-contained fluid line 110 and the first fluid line 120. However, it will be understood that the first filter 420 can be coupled to and/or in fluid communication with other components of the modular apparatus 100 to remove debris and contaminants as required to achieve the purposes of the present invention.

In one embodiment, the present invention may further comprise a second fluid line control valve and/or a second filter. The second fluid line control valve may be coupled to and/or in fluid communication with the second fluid line 242, the second inlet port 244, the second outlet port 246, and the second pump 260 of the liquid-cooled unit 240 of the apparatus 100. The second fluid line control valve can be adapted for managing the flow of the liquid that is selectively displaced or moved by the second pump 260. In one embodiment, the second fluid line control valve can be adapted for regulating the flow rate of water that is displaced or moved by the second pump 260, 360.

In another embodiment, the second filter may be coupled to and/or in fluid communication with the second fluid line 242, the second inlet port 244, the second outlet port 246, and the second pump 260 of the apparatus 100. The second filter can be adapted for removing debris and contaminants from the desired liquid that is moving through the second fluid line 242, which can aid in the circulation of the desired liquid and the heat transfer between the self-contained fluid line 110 and the second fluid line 242.

While a filter is shown specifically with regard to FIG. 4, any of the embodiments shown in FIGS. 1-4 may include a filter. Additionally, it should be noted that because the modular apparatus 100 circulated filtered and chilled water through the livewell 111, clean water regularly enters the livewell 111, which can decrease ammonium buildup due to the existence of live fish in a small container. Additionally, fish and other aquatic animals may become agitated when confined to a small water volume, resulting in bodily reactions such as vomiting or other bodily functions. Circulating fresh and filtered water in the livewell 111 generated by the modular apparatus 100 also expels and removes the bodily reactions caused by agitated fish. If these contaminants were not removed, fish may become "green eyed" or die, resulting in a disqualification of the caught fish during a fishing competition. Water chilled to a proper temperature also prevents agitation because the cold-blooded fish are not forced to adjust bodily temperature dramatically. Thus, the modular apparatus demonstrates an improvement over prior art livewells.

Although the embodiments discussed herein may generally identify the exchange or transfer of heat from the livewell in a removal manner, it will be understood that the present invention, and the components thereof, can be adapted and arranged for purposes of exchanging or transferring heat to the livewell or other container housing water. In an exemplary embodiment, the evaporator 150 can be adapted for exchanging or transferring heat from the desired medium of the self-contained fluid line 110 to the first fluid line 120. In a further exemplary embodiment, the condenser 130 can be adapted for exchanging or transferring heat to the self-contained fluid line 110, including heat from a medium of ambient or higher temperature, whether as a forced air coil unit 140, a liquid-cooled unit 240, or a cold plate heat sink unit.

As best shown in FIGS. 5-10, the present invention may further comprise a modular enclosure 500. The enclosure may comprise a front panel 510, a first side panel 520, a second side panel 530, a rear panel 540, a top panel 550, and a bottom panel 560. In one embodiment, the front panel 510 may be coupled with the first side panel 520 and the second side panel 530, such that the front panel 510 contacts the edges of the respective side panels 520, 530. At least one of the first side panel 520 and the second side panel 530 may extend generally perpendicular from the front panel 510. The rear panel 540 may be coupled to the first side panel 520 and the second side panel 530 in a manner similar to the front panel 510. In such an embodiment, the rear panel 540 may be generally opposite of the front panel 510. In one embodiment, the rear panel 540 may be oriented generally parallel to the front panel 510.

In another embodiment, the top panel 550 can be coupled with the front panel 510, the first side panel 520, the second side panel 530, and the rear panel 540, such that the top panel 550 contacts the edges of the respective elements. At least one of the front panel 510, the first side panel 520, the second side panel 530, and the rear panel 540 may extend downwardly in a generally perpendicular manner from the top panel 550. In yet another embodiment, the bottom panel 560 may be coupled with the front panel 510, the first side panel 520, the second side panel 530, and the rear panel 540 in a manner similar to the top panel 550. In such an embodiment, the bottom panel 560 may be generally opposite of the top panel 550. In another embodiment, the top panel 550 may be oriented generally parallel to the bottom panel 560.

In one embodiment, the front panel 510, the first side panel 520, the second side panel 530, the rear panel 540, the top panel 550, and the bottom panel 560 may be coupled together by a plurality of fastening means. Such fastening means may include, without limitation, bolts, rivets, screws, pins, clamping members, glue and adhesive materials, any combination thereof, and any other suitable fastening means, whether presently known or later developed. In another embodiment, the front panel 510, the first side panel 520, the second side panel 530, the rear panel 540, the top panel 550, and the bottom panel 560 may be coupled through welding, gluing, any combination thereof, and any suitable joining means, whether presently known or later developed.

As shown in FIGS. 5-10, in one embodiment, the front panel 510, the first side panel 520, the second side panel 530, the rear panel 540, the top panel 550, and the bottom panel 560 may each generally define a square shape, and in combination, the enclosure 500 may generally define a generally compact cube shape. However, it will be understood that the front panel 510, the first side panel 520, the second side panel 530, the rear panel 540, the top panel 550, and the bottom panel 560 may each separately define any variety of suitable symmetric and non-symmetric geometric shapes, including varying and different shapes from one another, suitable for the purposes of the present invention. The dimensions of the front panel 510, the first side panel 520, the second side panel 530, the rear panel 540, the top panel 550, and the bottom panel 560 can all be such that the modular enclosure 500 is capable of being located or placed in a variety of areas, including areas with limited available space for storing the enclosure 500.

As best shown in FIG. 6, the front panel 510 may define a door or access panel 600 and comprise a lock 610 for securing the access panel 600. In one embodiment, the entire front panel 510 may comprise the access panel 600, as shown in FIG. 6, but it will be understood that the access panel 600 can consist of any lesser portion or portions of the front panel 510. The access panel 600 can be hingedly attached to the enclosure 500 by a plurality of rotating mounting means 602, such that the access panel 600 can be selectively pivoted and opened to access any contents within the enclosure 500. In one embodiment, the mounting means 602 can be located on a lateral side of the front panel 510, as shown in FIG. 6, so that the access panel 600 can be selectively pivoted and opened by generally traversing a horizontal plane. However, it will be understood that the mounting means 602 can be located at the top or bottom edges of the front panel 510, such that the door can be selectively pivoted and opened by generally traversing a vertical plane. In another embodiment, the lock 610 can be a keyed lock. However, it will be understood that the lock 610 can be any suitable locking means, including, without limitation, padlocks, deadbolts, lever handle locks, cam locks, dialed locks, any combination thereof, and any other suitable locking means, whether presently known or later developed.

Figure 7:
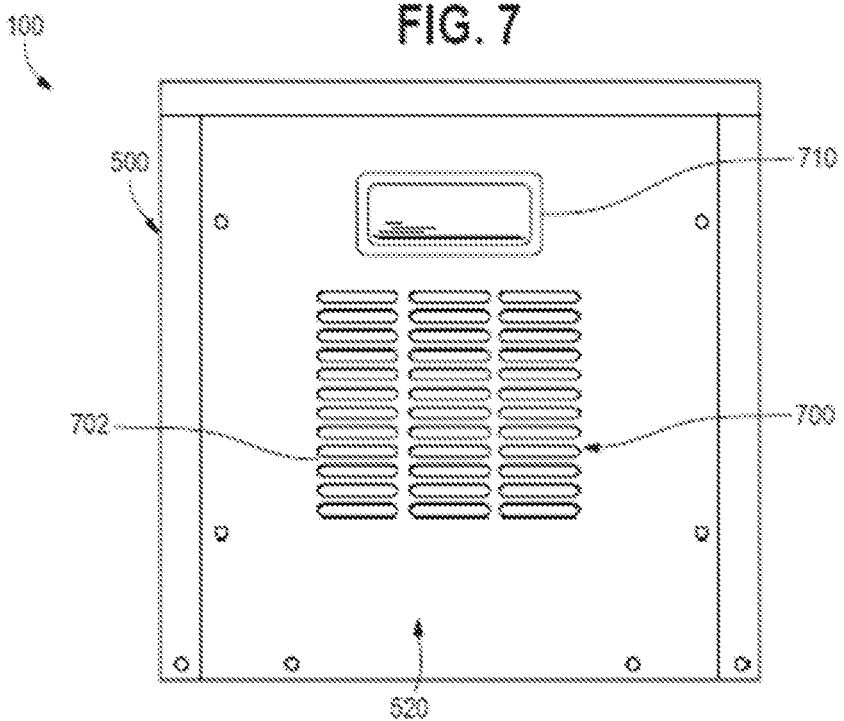
FIG. 7 is a first side view of the apparatus for managing the temperature of a livewell of FIGS. 5 and 6.

As best shown in FIG. 7, the first side panel 520 may comprise a first vent 700 and a first handle 710. The first vent 700 can be adapted for permitting air flow into, out of, and generally through the enclosure 500 during the operation of the present invention. In one embodiment, where the condenser (not shown) is a forced air coil unit (not shown), the first vent 700 can introduce or remove the desired medium (not shown), such as ambient air, that is circulated or agitated by the fluid agitator (not shown) of the forced air coil unit. In one embodiment, the first vent 700 may comprise a plurality of first slots 702. In another embodiment, the plurality of first slots 702 may be arranged in an array or columns and rows of first slots 702. As shown in FIG. 7, in one embodiment, the array of the plurality of first slots 702 may comprise three rows and twelve columns of first slots 702. The first handle 710 can be adapted to permit a user to grasp and lift the enclosure 500 and its contents.

Figure 8:
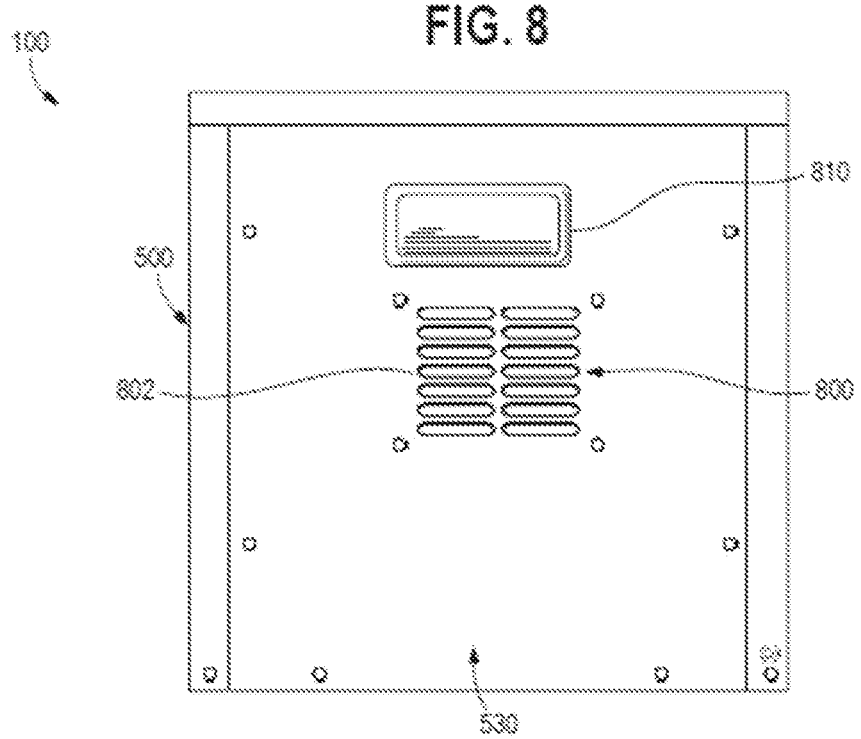
FIG. 8 is a second side view of the apparatus for managing the temperature of a livewell of FIGS. 5-7.

As best shown in FIG. 8, the second side panel 530 may comprise a second vent 800 and a second handle 810. The second vent 800 can be adapted for permitting air flow into, out of, and generally through the enclosure 500 during the operation of the present invention. In one embodiment, where the condenser (not shown) is a forced air coil unit (not shown), the second vent 800 can introduce or remove the desired medium (not shown), such as ambient air, that is circulated or agitated by the fluid agitator (not shown) of the forced air coil unit. In one embodiment, the second vent 800 may comprise a plurality of second slots 802. In another embodiment, the plurality of second slots 802 may be arranged in an array or columns and rows of second slots 802. As shown in FIG. 8, in one embodiment, the array of the plurality of second slots 802 may comprise two rows of seven columns of second slots 802. In combination with the first vent 710, the second vent 810 can be capable of creating a circulating airflow through the enclosure 500 for purposes of aiding the condenser as it removes heat from the desired medium of the self-contained fluid line (not shown). The second handle 810 can be adapted to permit a user to grasp and lift the enclosure 500 and its contents. The second handle 810 can be used in conjunction with the first handle 710.

Figure 9:
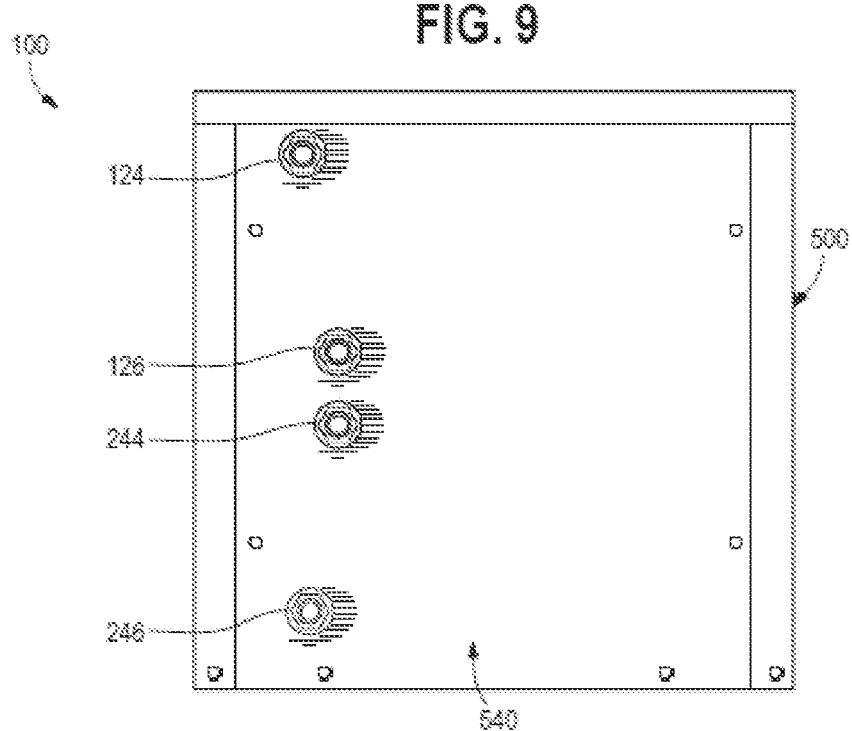
FIG. 9 is a second rear view of the apparatus for managing the temperature of a livewell of FIGS. 5-8.

As best shown in FIG. 9, the rear panel 540 may comprise a first inlet port 124 and a first outlet port 126. The first inlet port 124 and the first outlet port 126 may define operable openings in the rear panel 540 and, in one embodiment, comprise a threaded post for attaching, in a screwing manner, to external flexible hose or tubing (not shown) in fluid communication with a livewell (not shown). However, it will be understood that the first inlet port 124 and the first outlet port 126 may comprise any suitable arrangement for attaching to external hose or tubing. Such external hose or tubing can be capable of transferring a desired liquid from the livewell to the first inlet port 124 and from the first outlet port 126 back to the livewell. By transferring the desired liquid from the livewell, the desired liquid can be displaced or moved through the first fluid line (not shown) of the apparatus 100, including, without limitation, through the use of the first pump (now shown). Also shown in FIG. 9, the rear panel 540 may further comprise a second inlet port 244 and a second outlet port 246. The second inlet port 244 and the second outlet port 246 may define operable openings in the rear panel 540 and, in one embodiment, comprise a threaded post for attaching, in a screwing manner, to external flexible hose or tubing (not shown) in fluid communication with a body of water (not shown), including, without limitation a creek, river, pond, lake, sea, ocean, and any manmade version of the same, whether presently known or later developed. However, it will be understood that the second inlet port 244 and the second outlet port 246 may comprise any suitable arrangement for attaching to external hose or tubing. Such external hose or tubing can be capable of transferring a desired liquid from the body of water to the second inlet port 244 and, in some embodiments, from the second outlet port 246 back to the body of water. By transferring the desired liquid from the body of water, the desired liquid can be displaced or moved through a second fluid line (not shown) of a liquid-cooled unit (not shown) of the apparatus 100, including, without limitation, through the use of a second pump (now shown).

Figure 10:
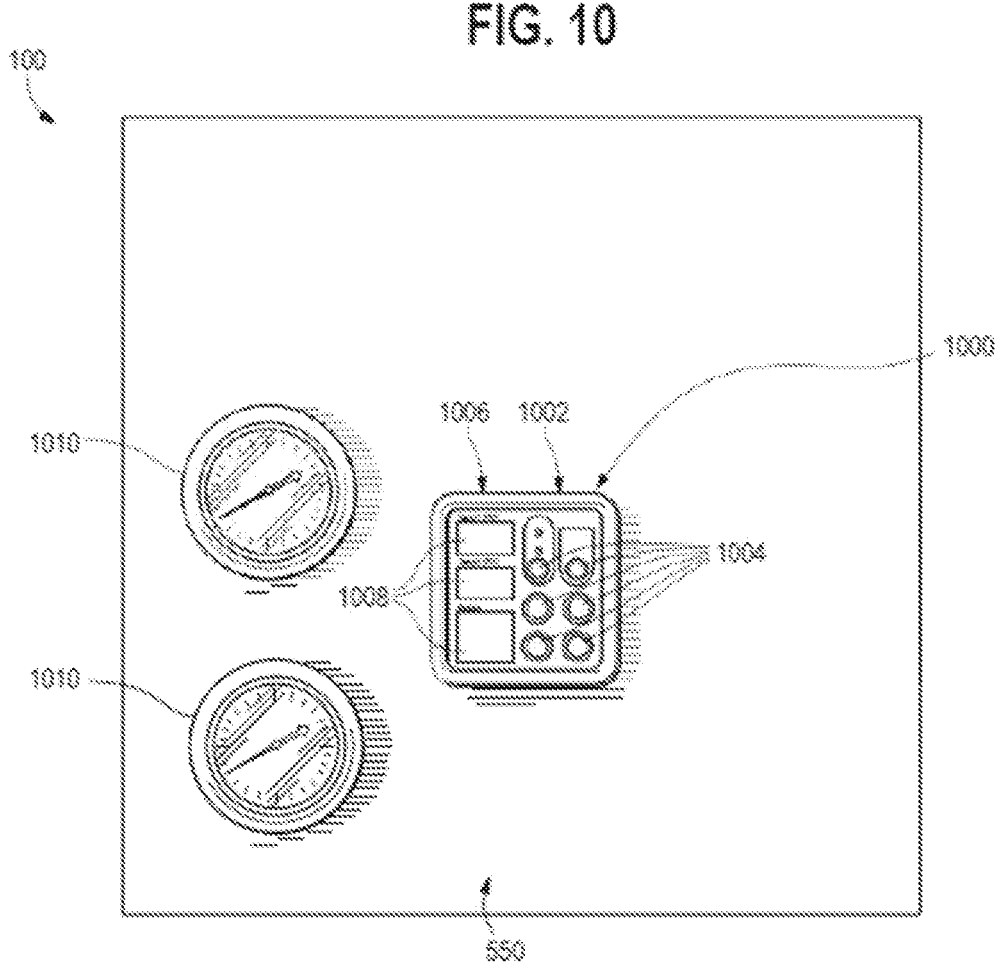
FIG. 10 is a top view of the apparatus for managing the temperature of a livewell of FIGS. 5-9.

As best shown in FIG. 10, the top panel 550 may comprise a user interface 1000 and at least one gauge 1010. The user interface 1000 may further comprise an input module 1002 with input devices 1004 and an output module 1006 with output devices 1008. The input module 1002 can be in communication with a controller (not shown). The controller can be configured to be instructed or directed by an individual or an operator via the input module 1002, or in some similar manner. The input module 1002 can be configured to adjust, upon instruction or direction of an individual or an operator, one or more operational characteristics of the apparatus 100, and any component thereof. The input module 1002 can comprise one or more devices, including, without limitation, the input devices 1004. In one embodiment, the input devices 1004 can comprise programmable push buttons associated with predetermined or preset input values and characteristics. However, it will be understood that the input devices 1004 can comprise any means suitable for providing an input for the input module 1002, including, without limitation, a keyboard, touchpad, touch screen, control, joystick, microphone with associated speech recognition software, and the like, whether presently known or later developed. The input module 1002 can be configured to facilitate remote operation at a location other than one that is immediately adjacent or proximate the apparatus 100. In another embodiment, the input module 1002 can be another device (e.g., mobile electronic device, smartphone (iOS or Android), laptop, fishing vessel control interface) in communication with controller via any wireless connection (WiFi, Bluetooth, NFC, etc.).

The output module 1006 can be in communication with a controller. The output module 1006 can be configured to output or provide at least one signal, value, or characteristic upon instructions from the controller. In one embodiment, the at least one signal generated by the output module 1006 can be a digital or audible indication, such as a sound, to an operator that corresponds with desired and/or preset values, thresholds, calculations, algorithms, and/or the like for purposes of alerting the operator. In another embodiment, the at least one signal generated by the output module 1006 can be an electronic instruction to another device (e.g., mobile electronic device, smartphone (iOS or Android), laptop, fishing vessel control interface) in communication with the output module 1006 via any wireless connection (WiFi, Bluetooth, NFC, etc.), such as a component of the apparatus 100 or an at least one processing unit (not shown). The at least one signal provided by the output module 1006 can be received by a device, computer, or processor, including, without limitation, the output devices 1008, for purposes of manually or automatically adjusting one or more of the operational characteristics of the apparatus 100. The output module 1006 can be configured to facilitate remote operation at a location other than one that is immediately adjacent or proximate the apparatus 100.

In one embodiment, the output devices 1008 can comprise programmable display screens capable of displaying predetermined or preset output values and characteristics based on the instructions provided by a controller. However, it will be understood that the output devices 1008 can comprise any means suitable for providing an output via the output module 1006, whether presently known or later developed. In one embodiment, the display screens of the output devices 1008 can comprise a device by which information can be instantaneously and visually presented to an operator of the apparatus 100 or to a remotely located monitor, manager, or operator of the apparatus 100. For example, the display screen can provide visual feedback, including, without limitation, real-time indications of the operational characteristics of the apparatus 100. The real-time indications can include, without limitation, temperature, entry temperature, exit temperature, temperature setting, voltage, pressure, volumetric flow rate, water oxygen levels, water pH levels, water ammonia levels, historical fault codes (e.g., compressor high voltage failure, compressor low voltage failure, unit high voltage, unit low voltage, outlet water temperature is to low, water outlet temperature probe failure, water inlet temperature probe failure, inlet water flow is to low, outlet water flow is to low, and water inlet and outlet temperature is to large), and other operational characteristics of the apparatus 100 Further, the displays may comprise a monitor or screen that is stationary in nature or that is mobile in nature. A mobile display can be a computer tablet, smart phone, personal data assistant ("PDA"), and/or the like. The output device 1008 can also exist nearby a fishing vessel's steering wheel or fishing seat so that a user can see the livewell temperature for any location or designated locations on the fishing vessel.

As shown in FIG. 10, the apparatus 100 can comprise one user interface 1000 located on top panel 550 of the enclosure 500. However, it will be understood that the apparatus can comprise any number of user interfaces 1000, which can be located at any location on the enclosure 500 or the apparatus 100, or can be located remotely at a location other than one that is immediately adjacent or proximate the apparatus 100. Such remote use of the user interface 1000 can be achieved in close proximity to the apparatus 100, such as on the fishing vessel (not shown) to which a livewell (not shown) can be attached, or at further distances, such as on the shore or at greater distances. The at least one gauge can be adapted for outputting certain predetermined or preset characteristics of the apparatus 100, including, without limitation, certain pressure or pressures occurring throughout the apparatus 100, and the components thereof, during operation.

Figure 11:
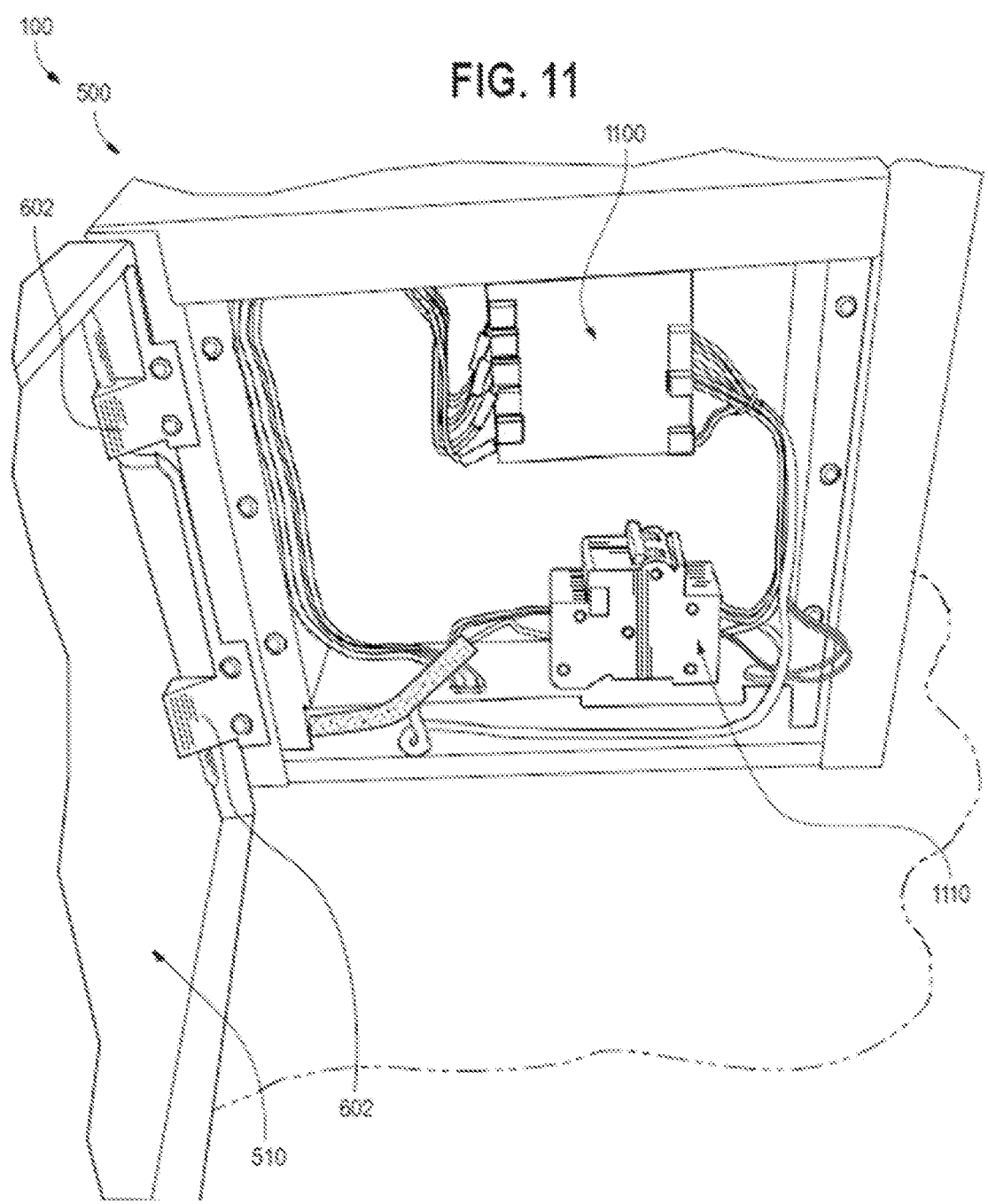
FIG. 11 is a partial perspective view of the interior space of the apparatus for managing the temperature of a livewell of FIGS. 5-10.

In another embodiment, as shown in FIG. 11, the present invention may further comprise one or more of the following: (a) a controller 1100; and/or (b) an adaptable power interface 1110. FIG. 11 depicts the enclosure 500 with the front panel 510, and the access panel 600 thereof, in an open position, such that some of the internal components of the apparatus 100 are visible. The controller 1100 can be a device adapted to receive various inputs, generate desired outputs, and control various devices. In one embodiment, the controller 1100 can comprise a printed circuit board or multiple printed circuit boards coupled together. In another embodiment, the controller 1100 can comprise any electrical circuit or any combination of suitable electrical components and conductors, operably coupled together, whether presently known or later developed. In one embodiment, the controller 1100 can be adapted for use with wireless devices via Wi-Fi, Bluetooth, and the like. Although FIG. 11 depicts one controller 1100, it will be understood that the apparatus 100, according to the present invention, can contain any suitable number of controllers 1100. Additionally, the controller 1100 can comprise a programmable processor or other advanced controller implementing software applications designed to chill water in the livewell as well as monitor and detect errors related to chilling the water in the livewell, which is described in further detail below.

The controller 1100 can be adapted, on-site and off-site via by internet, satellite, and other unknown carriers of communication of future technologies, to allow an individual or individuals to have the ability to control the various elements of the invention. In one embodiment, the controller 1100 can be in communication with an input module (not shown) and an output module (not shown). In another embodiment, the controller 1100 can be in communication with and generally control various components of the apparatus 100, including, without limitation, the compressor 112, the first pump 122, the condenser 130, the fluid agitator, the second pump 260, 360, the first fluid line control valve 410, and/or the second fluid line control valve. In a preferred embodiment, the controller 1100 can adjust certain operational characteristics of the apparatus 100 and the compressor 112, the first pump 122, the condenser 130, the fluid agitator 142, the second pump 260, 360, the first fluid line control valve 410, and/or the second fluid line control valve. In an exemplary embodiment, an individual or individuals can regulate the temperature of the livewell (not shown), either in degrees Fahrenheit or degrees Celsius, by selectively adjusting the speed of the first pump 122, the fluid agitator 142, and/or the second pump 260, 360. In another embodiment, the controller 1100 can automatically control the apparatus 100, and the various components thereof, with little to no instruction from an operator.

In one embodiment, the controller 1100 can control the refrigeration components of the modular apparatus 100 (e.g. the compressor 112, the first pump 122, the condenser 130, the fluid agitator, the second pump 260, 360, the first fluid line control valve 410, and/or the second fluid line control valve) to cause the water in the livewell to have a desired temperature. The controller 1100 can interface with a temperature probe to determine the water temperature in the livewell, and cause the refrigeration components to turn off upon the livewell water reaching the desired temperature. The controller 1100 can instruct the refrigeration components to turn back on and again chill water entering the livewell in response to the temperature probe determining that the livewell water temperature is a predetermined number of degrees higher than the desired temperature (e.g., 2 Fahrenheit degrees higher). In this way, the livewell needs no ice, as in conventional livewell chilling methods. In some embodiments, the controller 1100 can also determine if the water in the livewell is too cold, and heat the water entering the livewell to cause the livewell water to reach the desired temperature.

Additionally, the controller 1100 can be programmed to turn off the modular apparatus in response to error codes or other detected statuses, such as a moving boat. This process is described in further detail below with regard to FIG. 19.

The adaptable power interface 1110 can be adapted to control electricity or other electrical energy to energize at least one component of the invention upon the instruction or direction of an individual or an operator, and to otherwise facilitate the control of the apparatus 100 and the various components thereof. In one embodiment, the adaptable power interface 1110 can be coupled with or in communication with at least one component of the apparatus 100, including, without limitation, the compressor 112, the first pump 122, the condenser 130, the fluid agitator, the second pump 260, 360, the first fluid line control valve 410, the second fluid line control valve, and/or the controller 1100.

In a preferred embodiment, the apparatus 100 is capable of interchangeably operating with alternating current ("AC") electric current, including 110-volt AC and 220-volt AC, and direct current ("DC") electric current, including 12-volt DC, 24-volt DC, 36-volt DC, or 48-volt DC. The adaptable power interface 1110 can be adapted for use with a variety of voltages, including, without limitation, 110-volt AC, 220-volt AC, 12-volt DC, 24-volt DC, 36-volt DC, or 48-volt DC, from a variety of energy sources, including, without limitation, battery, deep-cycle battery, lithium material batteries and future discovery of advanced battery materials, commercial, solar-powered, wind-powered, water-powered, and the like. In an exemplary embodiment, the adaptable power interface 1110 can permit an operator to select between 24-volt DC and 36-volt DC electric current originating from a battery or batteries coupled to the troll motor of a fishing vessel to which the apparatus 100 is coupled. In another exemplary embodiment, the adaptable power interface 1100 can be used to allow AC electric current to control electricity or other electrical energy to energize at least one component of the invention, when the apparatus 100 is used in connection with a livewell located on or adjacent to land.

In one embodiment, an operator can alter the operating electric current of the apparatus 100, from AC to DC or DC to AC, through the use of the adaptable power interface 1110, depending on the available energy sources. In another embodiment, an operator can alter the operating voltage of the apparatus, including, without limitation, between 24-volt DC and 36-volt DC, through the use of the adaptable power interface 1110, depending on the available energy sources. In yet another embodiment, an operator can alter the operating voltage of the apparatus through the use of certain connectors or ports provided on the controller (not shown) and/or a printed circuit board.

Figure 12:
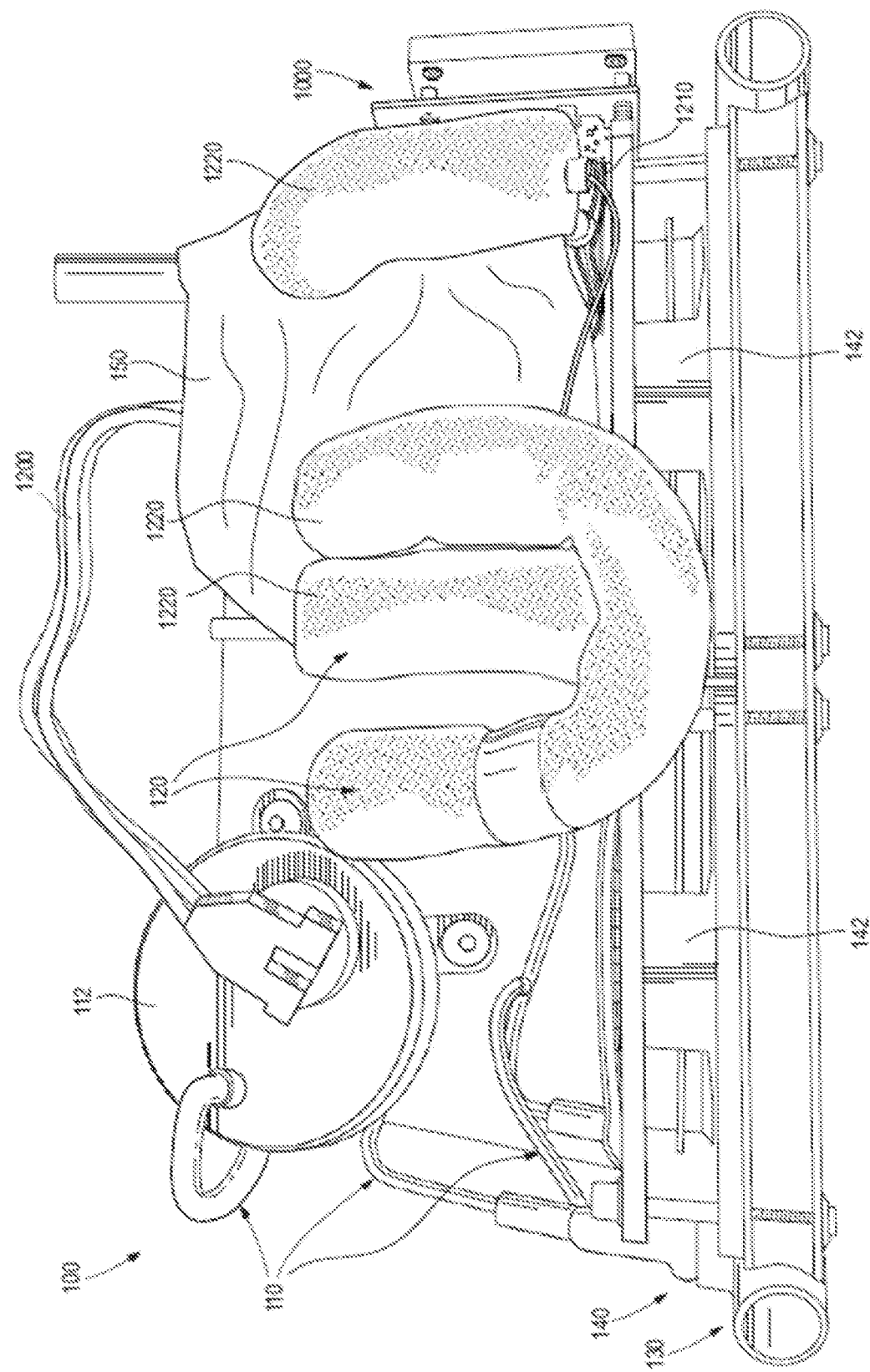
FIG. 12 is a front view of an apparatus, without an enclosure, for managing the temperature of a livewell in accordance with one embodiment of the present invention.

FIG. 12 shows an apparatus 100 for managing the temperature of a livewell in accordance with one embodiment of the present invention. The apparatus 100 depicted in FIG. 12 is shown without an enclosure. As best shown in FIG. 12, the apparatus 100 can comprise a self-contained fluid line 110, a compressor 112, a first fluid line 120, a condenser 130, a forced air coil unit 140 comprising at least one fluid agitator 142, an evaporator 150, and a controller 1100. The compressor 112 can be coupled to an energy source (not shown) by power cables 1200. As depicted in FIG. 12, the forced air coil unit 140 can comprise two fluid agitators 142 coupled with the self-contained fluid line 110. As shown in FIG. 12, in one embodiment, the controller 1100 can be a printed circuit board and be connected to the various components of the apparatus 100 by wiring 1210. The apparatus 100 can further comprise insulation foam 1220 for insulating the various component thereof.

Figure 13:
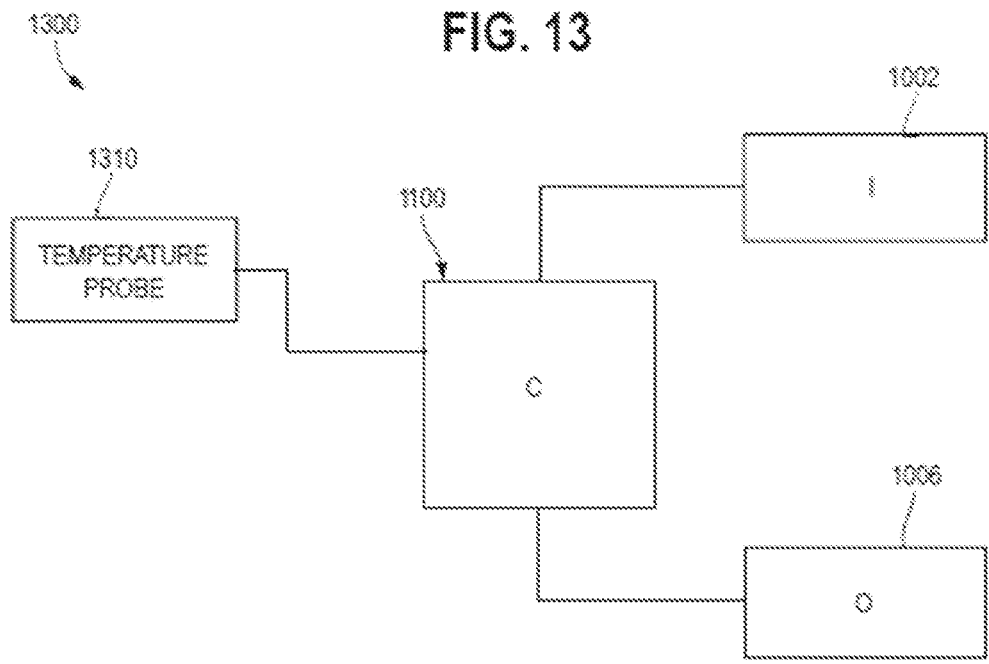
FIG. 13 is a schematic illustration of an example system for managing the temperature of a livewell in accordance with one embodiment of the present invention.

FIGS. 13-16 provide schematic representations of a system 1300 for managing the temperature of a livewell (not shown). As illustrated in FIG. 13, the system 1300 can generally comprises an input module 1002, an output module 1006, a controller 1100, and a temperature probe 1310. The input module 1002 and the temperature probe 1310 can be in communication with the controller 1100, and the controller 1100 can be in communication with the output module 1006.

In one embodiment, the temperature probe 1310 can be a device adapted to sense or detect temperature, either in degrees Fahrenheit or degrees Celsius. The temperature probe 1310 can be coupled with a livewell, the self-contained fluid line (not shown), the first fluid line (not shown), and/or the condenser (not shown) for sensing or detecting the temperature thereof or any component thereto. In a preferred embodiment, the temperature probe 1310 can be adapted for sensing or detecting the temperature of the livewell. The temperature probe 1310 of the present invention can be a thermocouple, resistance temperature detector, or other suitable temperature-measuring device or sensor, whether presently known or later developed. The temperature probe 1310 can further be adapted for generating a temperature data value as a desired output. In a preferred embodiment, the temperature probe 1310 can be in communication with the controller 1100 and can communicate the temperature data value to the controller 1100. The temperature data value can correspond with a temperature, in degrees Fahrenheit or degrees Celsius, of a specified environment or locale. It will be understood that the system 1300 of the present invention can contain any suitable number of temperature probes 1310. The temperature probe 1310 can connect to the controller 1100 via any wired or wireless connection.

Figure 14:
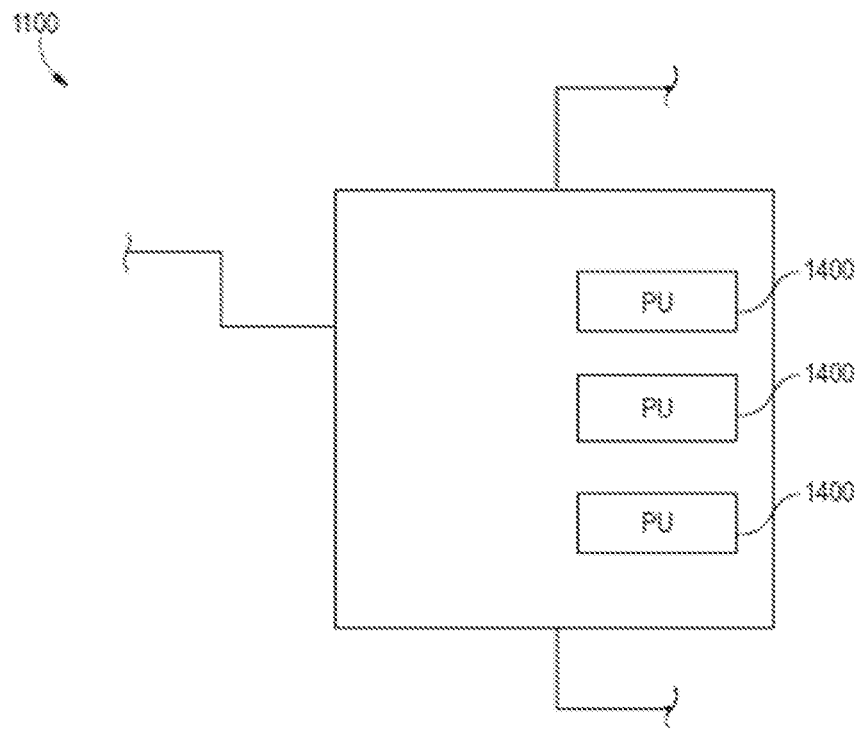
FIG. 14 is a schematic illustration of a portion of the system of FIG. 13.

As best illustrated in FIG. 14, in one embodiment of the present invention, the controller 1100 can generally comprise at least one processing unit 1400 configured to carry out instructions either hardwired as part of an application-specific integrated circuit or provided as code or software stored in a memory (not shown). In another embodiment, the at least one processing unit 1400 can be in communication with a memory.

Figure 15:
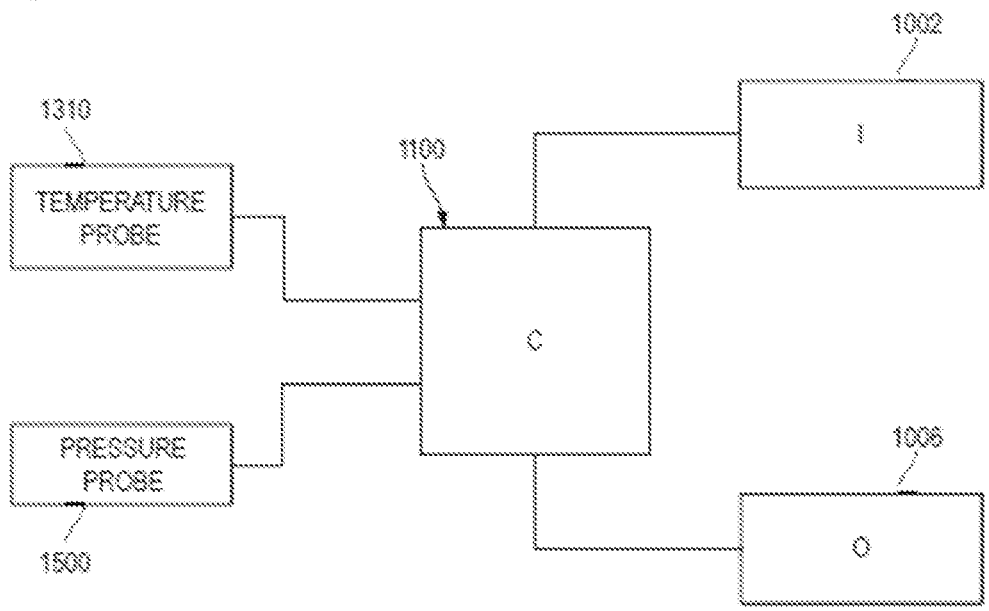
FIG. 15 is a schematic illustration of an example system for managing the temperature of a livewell in accordance with another embodiment of the present invention.

As best illustrated in FIG. 15, in another embodiment of the present invention, the system 1300 can further comprise a pressure probe 1500 that can be in communication with the controller 1100. In one embodiment, the pressure probe 1500 can be a device adapted to sense or detect pressure, including relative pressure and absolute pressure. The pressure probe 1500 can be coupled with the self-contained fluid line (not shown), the first fluid line (not shown), the second fluid line (not shown), and/or the condenser (not shown) for sensing or detecting the pressure thereof or any component thereto. The pressure probe 1500 of the present invention can be a pressure sensor, static pressure probe, a multi-hole pressure probe, a pressure transducer sensor, or other suitable pressure-measuring device or sensor, whether presently known or later developed. The pressure probe 1500 can further be adapted for generating a pressure data value as a desired output. Additionally, the pressure probe 1500 can detect low or zero pressure to detect various error statuses. In a preferred embodiment, the pressure probe 1500 can be in communication with the controller 1100 and can communicate the pressure data value to the controller 1100. The pressure data value can correspond with a pressure, in absolute or relative terms, of a specified environment or locale. It will be understood that the system 1300 of the present invention can contain any suitable number of pressure probes 1500. The pressure probe 1500 can connect to the controller 1100 via any wired or wireless connection.

Figure 16:
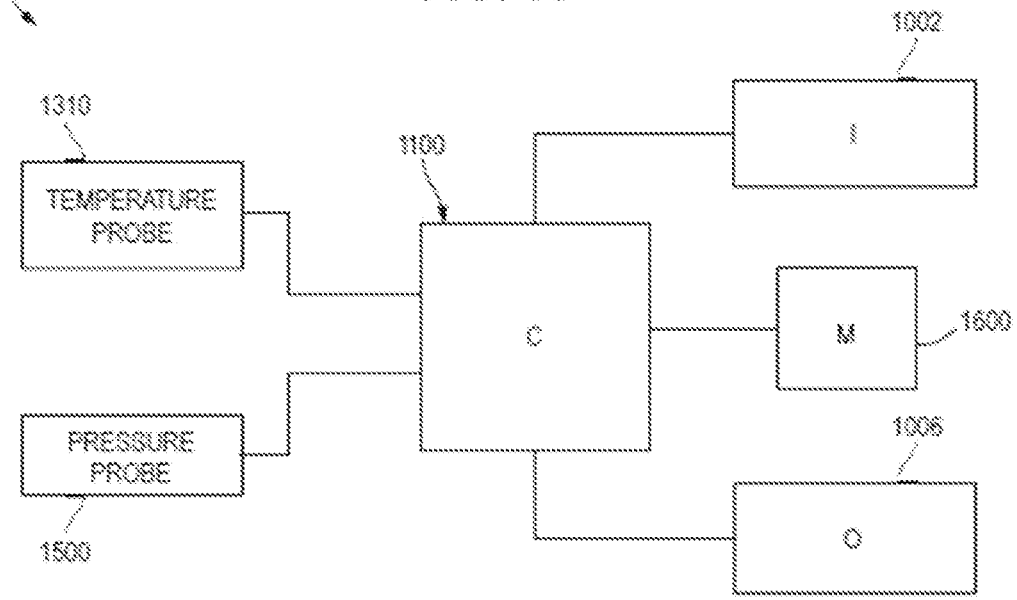
FIG. 16 is a schematic illustration of an example system for managing the temperature of a livewell in accordance with yet another embodiment of the present invention.

As best illustrated in FIG. 16, in yet another embodiment of the present invention, the system 1300 can further comprise a memory 1600 that can be in communication with the controller 1100. The controller 1100 can be configured to be instructed or directed by the memory 1600, or in some similar manner. The memory 1600 can comprise a non-transient computer-readable medium or persistent storage device for storing data or other information for use by the system 1300 or generated by the input module 1002, the temperature probe 1310, at least one processing unit 1400, and/or the pressure probe 1500. In one embodiment, the memory 1600 can store the value or cumulative values of the temperature data values generated by the temperature probe 1310 and the pressure data values generated by the pressure probe 1500. In another embodiment, the memory 1600 can store instructions in the form of code or software for the controller 1100 and/or at least one processing unit 1400. The memory 1600 can be provided with the controller 1100 and/or at least one processing unit 1400, or it can be provided remote from the controller 1100 and/or at least one processing unit 1400. In yet another embodiment, the memory 1600 can comprise a plurality of modules or databases that contain various data values.

In a preferred embodiment, the output module 1006 and/or the controller 1100 can be in communication with and adapted for activating the first pump 122 and/or the second pump 260, 360 for purposes of selectively displacing or moving, respectively, a desired liquid through the first fluid line 120 and/or a desired liquid through the second fluid line 242, to aid in the circulation of the same. In one embodiment, by circulating the desired liquids in the respective fluid lines 120, 242, the system 1300 can be capable of exchanging or transferring heat from the livewell. In another embodiment, by circulating the desired liquids in the respective fluid lines 120, 242, the system 1300 can be capable of exchanging or transferring heat to the condenser 130. In a preferred embodiment, when the value of the temperature data value generated by the temperature probe 1310 equals or exceeds a predetermined value, the controller 1100 can cause the first pump 122 and/or the second pump 260, 360 to be activated via at least one signal. It will be understood, however, that the output module 1006 and/or the controller 1100 can be in communication with and adapted for activating any component of the apparatus 100 for purposes of exchanging or transferring heat from the livewell, including the compressor 112, the condenser 130, the fluid agitator, the first fluid line control valve 410, and/or the second fluid line control valve.

Although the embodiments discussed herein may generally identify the use of a single apparatus 100 in connection with a single livewell, it will be understood that the present invention can include the use of any suitable number of apparatuses 100 in connection with any desired number or sizes of livewell or other containers housing water. In an exemplary embodiment, multiple apparatuses 100 can be used in conjunction to manage the temperature of a large livewell, including large livewells that may be located on land, or multiple livewells together. In an exemplary embodiment, the size of the livewell can be 1,000 gallons or larger, and several apparatuses 100 of similar size and arrangements can be provided for adequately managing the temperature of the same. However, it will be understood that there is no limit on the number of apparatuses 100 that can be used to manage a large livewell, and any number of apparatuses 100 according to the present invention can be used to manage the temperature of any large livewell regardless of the size. Further, the present invention may comprise multiple user interfaces 1000 used in connection with managing the temperature of a large livewell or multiple livewells. In one embodiment, the multiple user interfaces 1000 can comprise respective input modules 1002, each configured to adjust one or more operational characteristics of the respective apparatus or apparatuses 100 used in the connection with the livewell or livewells, and output modules 1006, each configured to output or provide at least one signal, value, or characteristic associated the respective livewell or livewells. Further yet, the present invention may comprise multiple temperature probes 1310 to aid in managing the temperature of a large livewell or multiple livewells. In one embodiment, the multiple temperature probes 1310 can be capable of detecting several temperatures, and generating associated temperature data values, at several locations of a large livewell or in multiple livewells, so that the temperature of the same can be properly managed by the respective apparatuses. In these ways, multiple modular apparatuses 100 can be adaptively used in conjunction to adequately manage the temperature of any livewell or any arrangement livewell, without demanding large amounts of space for the apparatuses 100 or the enclosures 500 of the apparatuses 100.

Additionally, although the exemplary embodiments describe the modular apparatus 100 as interfacing with a fishing vessel, the modular apparatus can control fluid temperature on land or at sea. The modular apparatus need only connect to any fluid container to control and regulate temperature therein.

Figure 17:
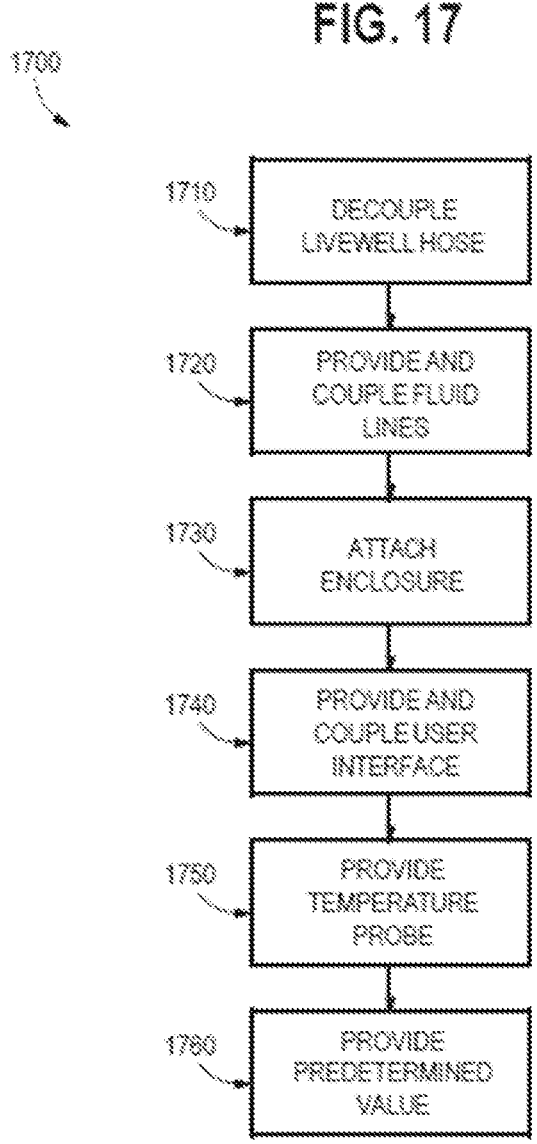
FIG. 17 is a diagram depicting an example method for installing a system for managing the temperature of a livewell in accordance with yet another embodiment of the present invention.
Figure 18:
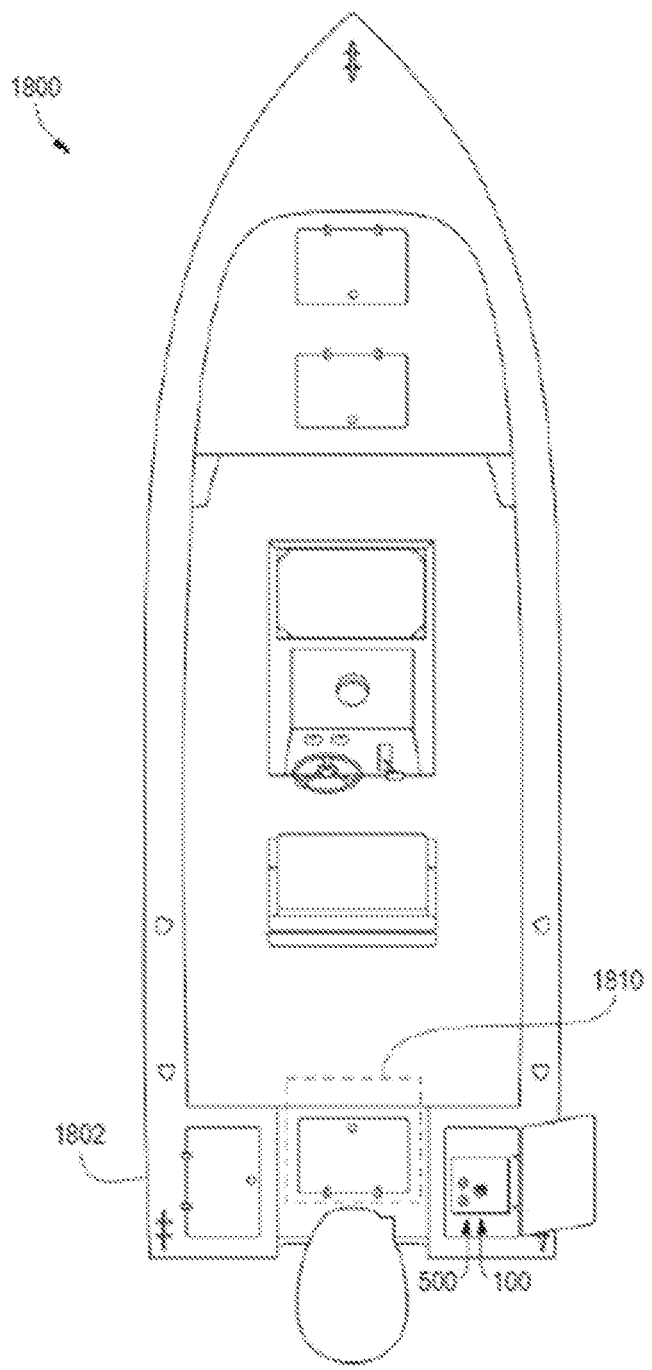
FIG. 18 is top view schematic representation of a fishing vessel containing the system of FIG. 17.

According to exemplary embodiments, a method or process of installing a system 1300 for managing the temperature of a livewell, of the type presented herein, can also be provided with the present invention. FIG. 17 is a diagram depicting an example method 1700 for installing the system 1300. As indicated by block 1710, existing livewell hose can be decoupled and removed from a livewell. In one embodiment, the livewell can be coupled to a fishing vessel, and the livewell hose may be in fluid communication with the body of water in which the fishing vessel is operated. Therefore, it may be necessary to remove the livewell hose connecting the livewell to the body of water. Such process may require restricting the ability of water from the body of water from entering the fishing vessel. Block 1720 illustrates how, after the livewell hose has been decoupled, a self-contained fluid line and a first fluid line can be provided, and the first fluid line can be coupled with the livewell. In one embodiment, an enclosure can be provided for housing the self-contained fluid line and the first fluid line, and the first fluid line can be coupled with the livewell via a first inlet port and a first outlet port defining operable openings of the enclosure. In a preferred embodiment, the self-contained fluid line can be in communication with the first fluid line, including via an evaporator. As indicated by block 1730, the enclosure can be attached, including fixedly or detachably, to an area adjacent the livewell. In one embodiment, this can including attaching the enclosure, whether fixedly or detachably, to a fishing vessel. In another embodiment, the enclosure 500 can be attached to a location adjacent a fishing vessel's 1800 stern or aft-most portion 1802, including in dry storage compartments provided on the fishing vessel or under a floorboard of the fishing vessel, and adjacent to the livewell 1810, as best shown in FIG. 18. Where no such compartment is provided, one can be fabricated and made for the fishing vessel. Block 1740 illustrates how a user interface, comprising an input module and an output module, both of which can be in communication with a controller, can be provided and coupled with the enclosure. In one embodiment, the controller can be configured to be instructed or directed by an individual or an operator via the input module, or in some similar manner. In another embodiment, the output module can be configured to output or provide at least one signal, value, or characteristic upon instructions from the controller. In yet another embodiment, the controller can be in communication with and generally control, by adjusting certain operational characteristics of a compressor, a first pump, a condenser, a fluid agitator, a second pump, a first fluid line control valve, and/or a second fluid line control valve. The user interface can be provided at a location other than one that is immediately adjacent or proximate the apparatus 100. As indicated by block 1750, a temperature probe can be provided and adapted to be in communication with the controller. In one embodiment, the temperature probe can be placed in or adjacent to the livewell. In another embodiment, the temperature probe can generate a temperature data value. In a preferred embodiment, the temperature probe can communicate the temperature data value to the controller. Block 1760 illustrates how, an individual or an operator can provide or input a predetermined value into the user interface, such that when the value of the temperature data value equals or exceeds the predetermined value, the controller can adjust an operational characteristic of the compressor, the first pump, the condenser, the fluid agitator, the second pump, the first fluid line control valve, and/or the second fluid line control valve. In one embodiment, by adjusting an operational characteristic of the compressor, the first pump, the condenser, the fluid agitator, the second pump, the first fluid line control valve, and/or the second fluid line control valve, the controller can be capable of automatically exchanging or transferring heat from the livewell. In another embodiment, by adjusting an operational characteristic of the compressor, the first pump, the condenser, the fluid agitator, the second pump, the first fluid line control valve, and/or the second fluid line control valve, the controller can be capable of automatically exchanging or transferring heat to the condenser.

In one embodiment, the method or process of installing the system 1300 can further comprise the step of providing an adaptable power interface adapted to control electricity or other electrical energy to energize various components of the system upon the instruction or direction of an individual or an operator. In one embodiment, the adaptable power interface can be coupled with or in communication with the compressor, the first pump, the condenser, the second pump, the first fluid line control valve, the second fluid line control valve, and/or the controller. The adaptable power interface can be adapted for use with a variety of voltages from a variety of energy sources. In one embodiment, an operator can alter the operating electric current through the use of the adaptable power interface. In another embodiment, an operator can alter the operating voltage through the use of the adaptable power interface. In yet another embodiment, an operator can alter the operating voltage through the use of certain connectors or ports provided on the controller and/or a printed circuit board.

Figure 19:
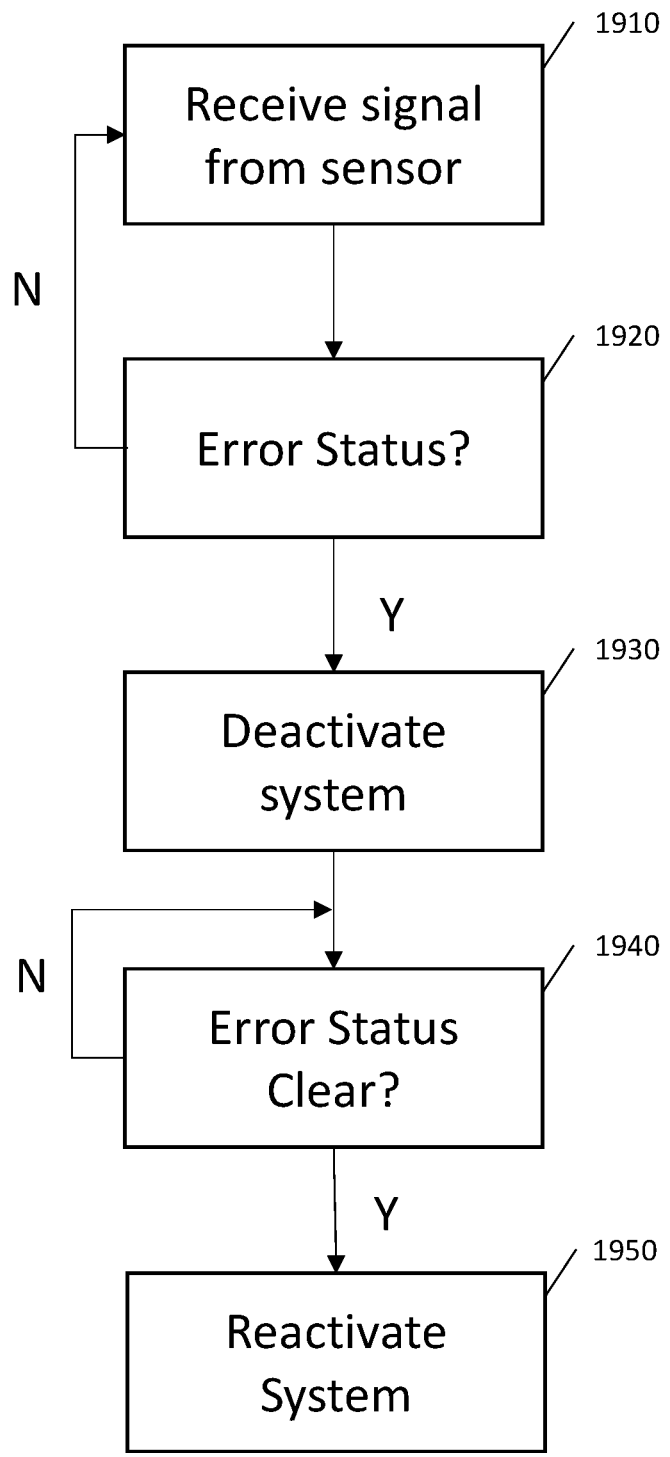
FIG. 19 illustrates a method for detecting statuses and controlling the modular apparatus based on detected statutes in accordance with yet another embodiment of the present invention.

FIG. 19 illustrates a method 1900 for detecting statuses and controlling the modular apparatus based on detected statutes. As shown, the method 1900 can include the controller 11000 receiving a signal from one or more sensors (e.g. the temperature probe 1310, the pressure probe 1500, voltage sensor on controller 11100) in step 1910, and the controller 1100 further determining if the sensor reading corresponds to one of a plurality of error statuses in step 1920. The plurality of statuses can include: low battery or no power coming from an AC power connection, a compressor high voltage failure, a compressor low voltage failure, a high voltage failure when the voltage from a power source is determined to be too high or does not match, a low voltage failure when the voltage from a power source is determined to be too low or does not match, water pressure at the outlet 126 is too low, temperature probe failure, pressure sensor failure, fluid pressure in the second fluid line is low— indicating the entry port 104 is not submerged within the body of water and the boat is moving. When the controller 1100 determines that one of the errors statuses exists, the controller 1100 turns off the modular apparatus 100 and, optionally, turns off any connected pumps in step 1930 (if not, the method returns to step 1910). Subsequently, the controller 1100 determines whether all error statutes have cleared in step 1940. If the controller 1100 determines that all the errors statuses have cleared, the controller 1100 turns the modular apparatus 100 back on and, optionally, turns on any connected pumps in step 1950 (if not, the method returns to step 1940. After turning the modular apparatus 100 back on in step 1950, the method returns to step 1910 and the controller 1100 returns to regulating the temperature within the livewell.

As an example of the method 1900, the controller 1100 can determine that the boat is moving in step 1920 after receiving a signal from the pressure probe 1500 in the second fluid line 242 indicating that fluid pressure in the second fluid line 242 is low. The controller 1100 understands that a low pressure reading in the second fluid line 242 indicates that the entry port 104 on the fishing vessel 102 is not submerged within the body of water, and the pump 260 is not pulling in any water from the entry port 104 because the entry port 104 is elevated above the surface of the water and is not in fluid communication with the body of water.

It is important to note that the construction and arrangement of the elements of the inventive concepts and inventions as described in this application and as shown in the figures above is illustrative only. Although some embodiments of the present inventions have been described in detail in this disclosure, those skilled in the art who review this disclosure will readily appreciate that many modifications are possible without materially departing from the novel teachings and advantages of the subject matter recited. All such modifications are intended to be included within the scope of the present inventions. Other substitutions, modifications, changes and omissions may be made in the design, operating conditions and arrangement of the preferred and other exemplary embodiments without departing from the spirit of the present inventions.

It is important to note that the apparatus of the present inventions can comprise conventional technology (e.g., as implemented in present configuration) or any other applicable technology (present or future) that has the capability to perform the functions and processes/operations indicated in the FIGURES. All such technology is considered to be within the scope of the present inventions and application.

What is claimed is:

1. A modular apparatus for managing the temperature of a livewell comprising:
    a self-contained fluid line;
    a first fluid line in communication with the self-contained fluid line and designed to provide fluid communication between the modular apparatus and the livewell;
    a condenser in communication with the self-contained fluid line;
    a controller,
    wherein the self-contained fluid line comprises an expansion valve in fluid communication with a compressor,
    wherein the controller is configured to communicate with a temperature probe that detects a temperature of water in the livewell and control at least one of the condenser, the compressor, and the expansion valve to cause the temperature of the water in the livewell to reach a desired temperature;
    an inlet port communicates with a second fluid line that connects to an entry port on a fishing vessel, wherein the entry port allows water from a body of water to enter the second fluid line; and
    an outlet port communicates with the second fluid line that also connects to an exit port on the fishing vessel, wherein the exit port expels water from the second fluid line out into the body of water,
    wherein the second fluid line communicates with the condenser to receive heat extracted by the modular apparatus, and returns heated water back to the body of water via the second fluid line,
    wherein the controller is configured to receive a signal from a pressure probe included within the second fluid line to determine whether the fishing vessel is driving to a new destination by determining that a pressure reading included in the signal from the pressure probe indicates an error status, and
    wherein the controller is configured to turn off the modular apparatus in response to determining that the fishing vessel is driving to the new destination.

2. The apparatus of claim 1, wherein the first fluid line further comprises:
    a filter in fluid communication with a first line inlet port and a first line outlet port,
    wherein the first fluid line control valve is included within the first fluid line,
    wherein the filter removes ammonia.

3. The apparatus of claim 1, wherein the controller reactivates the modular apparatus in response to determining that the fishing vessel has arrived at the new destination based on receiving a signal from the pressure probe indicating that fluid is again within the second fluid line when the pressure reading included in the signal indicates the error status has cleared.

4. The apparatus of claim 1, further comprising:
    a user interface comprising an input module in communication with the controller,
    wherein the input module inputs the desired temperature.

5. The apparatus of claim 1, wherein the condenser is a forced air coil unit comprising a fluid agitator coupled with the self-contained fluid line.

6. The apparatus of claim 1, wherein the entry port is positioned on the fishing vessel such that the entry port is submerged under a surface of the body of water when the fishing vessel is stationary and the entry port is elevated above the surface of the body of water when the fishing vessel is driving along the body of water.

7. The apparatus of claim 1, wherein a first flow sensor is positioned at the entry port and a second flow sensor is positioned at the exit port.

8. The apparatus of claim 1, wherein the controller is configured to turn off the apparatus when the signal from the pressure probe in the second fluid line indicates an error status, indicating the entry port is not submerged within the body of water and the boat is moving.

9. The apparatus of claim 1, wherein a wireless input module is in communication with the controller.

10. The apparatus of claim 9, wherein the wireless input module is a user interface.

11. The apparatus of claim 1, wherein the apparatus is a retrofit kit for the fishing vessel.

12. The apparatus of claim 1, wherein the modular apparatus further comprises:
    a front panel and a rear panel;
    a first side panel and a second side panel, wherein each of the first side panel and the second side panel has a vent;
    a top panel and a bottom panel; and
    a handle on the first side panel and a handle on the second side panel.

13. A system comprising:
    a modular apparatus comprising:
        a self-contained fluid line;
        a first fluid line in communication with the self-contained fluid line and provides fluid communication between the modular apparatus and a livewell;
        a condenser in communication with the self-contained fluid line; and
        a controller,
        wherein the self-contained fluid line comprises an expansion valve in fluid communication with a compressor,
        wherein the controller is configured to communicate with a temperature probe that detects a temperature of water in the livewell and control at least one of the condenser, the compressor, and the expansion valve to cause the temperature of the water in the livewell to reach a desired temperature; and
    a fishing vessel comprising:
        the livewell;
        a second fluid line;

an entry port on a fishing vessel, wherein the entry port allows water from a body of water to enter the second fluid line; and an exit port connected to the second fluid line that expels water from the second fluid line out into the body of water;

wherein the second fluid line communicates with the condenser to receive heat extracted by the modular apparatus and returns heated water back to the body of water via the second fluid line, wherein the controller is configured to receive a signal from a pressure probe included within the second fluid line to determine whether the fishing vessel is driving to a new destination by determining that a pressure reading included in the signal from the pressure probe indicates an error status, and wherein the controller is configured to turn off the modular apparatus in response to determining that the fishing vessel is driving to the new destination.

14. The system of claim 13, wherein the first fluid line further comprises:

a filter in fluid communication with the first inlet port and the first outlet port, wherein the filter removes ammonia.

15. The system of claim 13, wherein the controller is configured to reactivate the modular apparatus in response to determining that the fishing vessel has arrived at the new destination based on receiving a signal from the pressure probe indicating that fluid is again within the second fluid line when the pressure reading included in the signal indicates the error status has cleared.

16. The system of claim 13, wherein a first flow sensor is positioned at the entry port and a second flow sensor is positioned at the exit port.

17. The system of claim 13, wherein the controller is configured to turn off the apparatus when the signal from the pressure probe in the second fluid line indicates an error status, indicating the entry port is not submerged within the body of water and the boat is moving.

18. The system of claim 13, wherein a wireless input module is in communication with the controller.

19. The system of claim 18, wherein the wireless input module is a user interface.

20. The system of claim 13, wherein the system is a retrofit kit for the fishing vessel.

21. The system of claim 13, wherein the modular apparatus further comprises:

a front panel and a rear panel;

a first side panel and a second side panel, wherein each of the first side panel and the second side panel has a vent;

a top panel and a bottom panel; and a handle on the first side panel and a handle on the second side panel.

22. A system comprising:

a modular apparatus comprising:

a self-contained fluid line;

a first fluid line in communication with the self-contained fluid line and provides fluid communication between the modular apparatus and a livewell;

a condenser in communication with the self-contained fluid line; and a controller, wherein the self-contained fluid line comprises an expansion valve in fluid communication with a compressor, wherein the controller is configured to communicate with a temperature probe that is configured to detect a temperature of water in the livewell and control at least one of the condenser, the compressor, and the expansion valve configured to cause the temperature of the water in the livewell to reach a desired temperature; and a fishing vessel comprising:

the livewell;

a second fluid line;

an entry port on a fishing vessel, wherein the entry port allows water from a body of water to enter the second fluid line; and an exit port connected to the second fluid line that expels water from the second fluid line out into the body of water;

wherein the second fluid line communicates with the condenser to receive heat extracted by the modular apparatus and return heated water back to the body of water via the second fluid line, wherein the controller is configured to receive a signal from a pressure probe included within the second fluid line to determine that the entry port is not submerged in the body of water when a pressure reading included in the signal from the pressure probe indicates an error status, and wherein the controller is configured to turn off the modular apparatus in response to determining that the entry port is not submerged in water.

\* \* \* \* \*